United States Patent
Kasada

(10) Patent No.: US 12,300,276 B2
(45) Date of Patent: *May 13, 2025

(54) MAGNETIC TAPE HAVING CHARACTERIZED MAGNETIC LAYER, MAGNETIC TAPE CARTRIDGE, AND MAGNETIC TAPE APPARATUS

(71) Applicant: FUJIFILM Corporation, Tokyo (JP)

(72) Inventor: Norihito Kasada, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,433

(22) Filed: Jan. 24, 2024

(65) Prior Publication Data

US 2024/0221791 A1 Jul. 4, 2024

Related U.S. Application Data

(63) Continuation of application No. PCT/JP2022/028292, filed on Jul. 21, 2022.

(30) Foreign Application Priority Data

Jul. 26, 2021 (JP) .................................. 2021-121714
Oct. 8, 2021 (JP) .................................. 2021-165991

(51) Int. Cl.
*G11B 3/04* (2006.01)
*G11B 5/702* (2006.01)
(Continued)

(52) U.S. Cl.
CPC ............ *G11B 33/04* (2013.01); *G11B 5/7026* (2013.01); *G11B 5/7028* (2013.01); *G11B 5/70678* (2013.01)

(58) Field of Classification Search
None
See application file for complete search history.

(56) References Cited

U.S. PATENT DOCUMENTS

| | | | |
|---|---|---|---|
| 4,693,929 | A | 9/1987 | Ryoke et al. |
| 5,195,689 | A | 3/1993 | Beer et al. |

(Continued)

FOREIGN PATENT DOCUMENTS

| | | |
|---|---|---|
| JP | 11-250437 A | 9/1999 |
| JP | 2001-093138 A | 4/2001 |

(Continued)

OTHER PUBLICATIONS

International Preliminary Report on Patentability (With Translation of Written Opinion) dated Jan. 18, 2024 in Application No. PCT/JP2022/028292.

(Continued)

*Primary Examiner* — Kevin M Bernatz
(74) *Attorney, Agent, or Firm* — Sughrue Mion, PLLC

(57) ABSTRACT

Provided is a magnetic tape, in which, in an environment of a temperature of 23° C. and a relative humidity of 50%, an AlFeSil abrasion value$_{45°}$ of a magnetic layer surface measured at a tilt angle of 45° of an AlFeSil square bar is 20 μm or more and 50 μm or less, standard deviation of an AlFeSil abrasion value of the magnetic layer surface measured at each of tilt angles of 0°, 15°, 30°, and 45° of the AlFeSil square bar is 30 μm or less. The tilt angle of the AlFeSil square bar is an angle formed by a longitudinal direction of the AlFeSil square bar and a width direction of the magnetic tape. A magnetic tape cartridge and a magnetic tape apparatus include the magnetic tape.

12 Claims, 7 Drawing Sheets

(51) Int. Cl.
  *G11B 5/706* (2006.01)
  *G11B 33/04* (2006.01)

(56) References Cited

U.S. PATENT DOCUMENTS

| | | |
|---|---|---|
| 5,671,211 A | 9/1997 | Akashi et al. |
| 6,515,827 B1 | 2/2003 | Raymond et al. |
| 7,011,899 B2 | 3/2006 | Kato |
| 7,755,863 B2 | 7/2010 | Neumann et al. |
| 8,535,817 B2 * | 9/2013 | Imaoka ............ G11B 5/7085 428/844 |
| 9,311,946 B2 | 4/2016 | Tanaka et al. |
| 9,401,171 B2 | 7/2016 | Kasada et al. |
| 9,711,174 B2 | 7/2017 | Kasada et al. |
| 9,721,605 B2 | 8/2017 | Oyanagi et al. |
| 9,721,606 B2 | 8/2017 | Kasada |
| 9,767,835 B2 | 9/2017 | Tanaka |
| 9,984,716 B1 | 5/2018 | Kaneko et al. |
| 10,134,433 B2 | 11/2018 | Kasada et al. |
| 10,347,280 B2 | 7/2019 | Kasada et al. |
| 10,373,639 B2 | 8/2019 | Kasada et al. |
| 10,410,665 B2 | 9/2019 | Ozawa et al. |
| 10,410,666 B2 | 9/2019 | Kasada et al. |
| 10,431,248 B2 | 10/2019 | Kasada et al. |
| 10,431,249 B2 | 10/2019 | Kasada et al. |
| 10,438,628 B2 | 10/2019 | Kasada et al. |
| 10,477,072 B2 | 11/2019 | Kasada |
| 10,490,220 B2 | 11/2019 | Kasada et al. |
| 10,497,388 B2 | 12/2019 | Ozawa et al. |
| 10,515,661 B2 | 12/2019 | Kasada et al. |
| 10,522,180 B2 | 12/2019 | Kasada |
| 10,706,875 B2 | 7/2020 | Kasada et al. |
| 10,720,181 B1 | 7/2020 | Yamaga et al. |
| 10,803,904 B1 | 10/2020 | Yamaga et al. |
| 10,811,048 B2 | 10/2020 | Ozawa et al. |
| 10,839,849 B2 | 11/2020 | Tada et al. |
| 10,854,233 B2 | 12/2020 | Ozawa et al. |
| 10,984,833 B2 | 4/2021 | Yamaga et al. |
| 11,361,792 B2 | 6/2022 | Kasada |
| 11,423,932 B2 | 8/2022 | Ozawa et al. |
| 11,423,934 B2 | 8/2022 | Kasada |
| 11,495,246 B2 | 11/2022 | Kasada et al. |
| 11,581,015 B2 | 2/2023 | Kasada |
| 11,631,428 B2 | 4/2023 | Kaneko et al. |
| 11,631,429 B2 | 4/2023 | Kaneko et al. |
| 11,854,586 B2 * | 12/2023 | Kasada ............... G11B 5/71 |
| 11,864,033 B2 | 1/2024 | Chauhan et al. |
| 11,869,553 B2 * | 1/2024 | Kasada ............ G11B 5/7356 |
| 11,869,555 B2 * | 1/2024 | Kasada ............... G11B 5/65 |
| 11,869,557 B2 * | 1/2024 | Kasada ............ G11B 5/7356 |
| 11,869,558 B2 * | 1/2024 | Kasada ............... G11B 5/78 |
| 11,887,251 B2 | 1/2024 | Jutan et al. |
| 11,887,637 B2 | 1/2024 | Kasada |
| 11,894,032 B2 | 2/2024 | Ozawa et al. |
| 11,894,034 B2 | 2/2024 | Kasada |
| 2001/0008714 A1 | 7/2001 | Sueoka et al. |
| 2002/0086183 A1 | 7/2002 | Misawa |
| 2002/0098280 A1 | 7/2002 | Otsuka |
| 2002/0164503 A1 | 11/2002 | Tani et al. |
| 2003/0228489 A1 | 12/2003 | Doushita et al. |
| 2004/0066725 A1 | 4/2004 | Usui |
| 2004/0091746 A1 | 5/2004 | Nakamura et al. |
| 2004/0149846 A1 | 8/2004 | Zwettler et al. |
| 2004/0151946 A1 | 8/2004 | Kata et al. |
| 2004/0214046 A1 | 10/2004 | Ejiri et al. |
| 2005/0053804 A1 | 3/2005 | Kato |
| 2005/0153170 A1 | 7/2005 | Inoue et al. |
| 2005/0196645 A1 | 9/2005 | Doi et al. |
| 2006/0066999 A1 | 3/2006 | Ejiri |
| 2006/0204812 A1 | 9/2006 | Moriyama et al. |
| 2006/0208122 A1 | 9/2006 | Sogabe et al. |
| 2007/0262189 A1 | 11/2007 | Kubota |
| 2008/0259495 A1 | 10/2008 | Ichikawa et al. |
| 2009/0046396 A1 | 2/2009 | Nagata et al. |
| 2009/0086368 A1 | 4/2009 | Kakuishi et al. |
| 2011/0274947 A1 | 11/2011 | Ishiguro |
| 2012/0042899 A1 | 2/2012 | Boday et al. |
| 2012/0045664 A1 | 2/2012 | Tanaka et al. |
| 2012/0243120 A1 * | 9/2012 | Harasawa ............... G11B 5/70 |
| 2014/0327987 A1 | 11/2014 | Biskeborn et al. |
| 2016/0049167 A1 | 2/2016 | Biskeborn et al. |
| 2016/0171993 A1 | 6/2016 | Okubo |
| 2016/0189739 A1 | 6/2016 | Kasada et al. |
| 2017/0092315 A1 | 3/2017 | Ozawa et al. |
| 2017/0186460 A1 | 6/2017 | Kasada et al. |
| 2017/0221516 A1 | 8/2017 | Oyanagi et al. |
| 2017/0372740 A1 | 12/2017 | Ozawa et al. |
| 2018/0005737 A1 | 1/2018 | Sakane et al. |
| 2018/0147626 A1 | 5/2018 | Shirata et al. |
| 2018/0240479 A1 | 8/2018 | Kasada et al. |
| 2018/0240489 A1 | 8/2018 | Kasada et al. |
| 2018/0240493 A1 | 8/2018 | Tada et al. |
| 2018/0286442 A1 | 10/2018 | Ozawa et al. |
| 2018/0286444 A1 | 10/2018 | Kasada et al. |
| 2018/0286448 A1 | 10/2018 | Ozawa et al. |
| 2018/0286451 A1 | 10/2018 | Ozawa et al. |
| 2019/0027180 A1 | 1/2019 | Kasada et al. |
| 2019/0027181 A1 | 1/2019 | Ozawa et al. |
| 2019/0103130 A1 | 4/2019 | Kasada et al. |
| 2019/0164573 A1 | 5/2019 | Biskeborn |
| 2019/0304488 A1 | 10/2019 | Ozawa et al. |
| 2019/0304497 A1 | 10/2019 | Kurokawa et al. |
| 2019/0304498 A1 | 10/2019 | Ozawa et al. |
| 2019/0304499 A1 | 10/2019 | Kurokawa et al. |
| 2020/0005817 A1 | 1/2020 | Ozawa et al. |
| 2020/0066302 A1 | 2/2020 | Terakawa et al. |
| 2020/0090694 A1 | 3/2020 | Sano et al. |
| 2020/0098390 A1 | 3/2020 | Terakawa et al. |
| 2020/0251136 A1 | 8/2020 | Ozawa et al. |
| 2020/0251138 A1 | 8/2020 | Ozawa et al. |
| 2020/0279580 A1 | 9/2020 | Sano et al. |
| 2020/0302962 A1 | 9/2020 | Sawayashiki et al. |
| 2020/0312361 A1 | 10/2020 | Kasada |
| 2020/0342903 A1 | 10/2020 | Kasada |
| 2020/0342906 A1 | 10/2020 | Kasada |
| 2020/0342907 A1 | 10/2020 | Yamaga et al. |
| 2020/0365178 A1 | 11/2020 | Kasada |
| 2020/0365179 A1 | 11/2020 | Kasada |
| 2021/0012800 A1 | 1/2021 | Yamaga et al. |
| 2021/0287702 A1 | 9/2021 | Ozawa et al. |
| 2021/0375311 A1 | 12/2021 | Ozawa et al. |
| 2021/0407540 A1 | 12/2021 | Sekiguchi et al. |
| 2022/0020392 A1 | 1/2022 | Kurokawa et al. |
| 2022/0028421 A1 | 1/2022 | Kaneko et al. |
| 2022/0028422 A1 | 1/2022 | Kaneko et al. |
| 2022/0208227 A1 | 6/2022 | Yamaga |
| 2022/0254375 A1 | 8/2022 | Kaneko et al. |
| 2022/0270642 A1 | 8/2022 | Yamaga et al. |
| 2022/0270644 A1 | 8/2022 | Kurokawa et al. |
| 2022/0358958 A1 | 11/2022 | Kasada et al. |
| 2022/0358961 A1 | 11/2022 | Kasada et al. |
| 2022/0366935 A1 | 11/2022 | Kasada et al. |
| 2023/0097367 A1 | 3/2023 | Kasada |
| 2023/0103135 A1 | 3/2023 | Kasada |
| 2023/0103562 A1 | 4/2023 | Kasada |
| 2023/0104145 A1 | 4/2023 | Kasada |
| 2023/0104452 A1 | 4/2023 | Kasada |
| 2023/0106585 A1 | 4/2023 | Kasada |
| 2023/0109470 A1 | 4/2023 | Kasada |
| 2023/0110514 A1 | 4/2023 | Kasada |
| 2023/0115333 A1 | 4/2023 | Kasada |
| 2023/0123823 A1 | 4/2023 | Kasada |
| 2023/0238025 A1 | 7/2023 | Ozawa et al. |
| 2024/0020393 A1 * | 1/2024 | Mehta ............... G06F 21/602 |
| 2024/0096363 A1 * | 3/2024 | Kasada ............... G11B 5/588 |
| 2024/0096366 A1 * | 3/2024 | Kasada ............ G11B 5/7085 |
| 2024/0096367 A1 * | 3/2024 | Kasada ............ G11B 5/7028 |
| 2024/0105224 A1 * | 3/2024 | Kasada ........... G11B 5/70678 |
| 2024/0105228 A1 | 3/2024 | Kasada |
| 2024/0105229 A1 * | 3/2024 | Kasada ............ G11B 5/7356 |
| 2024/0112697 A1 * | 4/2024 | Kurokawa ......... G11B 5/7085 |
| 2024/0170014 A1 | 5/2024 | Kasada |

(56) References Cited

U.S. PATENT DOCUMENTS

| | | | |
|---|---|---|---|
| 2024/0203451 A1 | 6/2024 | Kasada | |
| 2024/0321309 A1* | 9/2024 | Kasada | G11B 5/735 |

FOREIGN PATENT DOCUMENTS

| | | | |
|---|---|---|---|
| JP | 2002-269711 | | 9/2002 |
| JP | 2002-367151 | A | 12/2002 |
| JP | 2003-022520 | | 1/2003 |
| JP | 2004-005795 | | 1/2004 |
| JP | 2004-055137 | | 2/2004 |
| JP | 2004-288332 | A | 10/2004 |
| JP | 2005-085305 | | 3/2005 |
| JP | 2005-222598 | A | 8/2005 |
| JP | 2005-259198 | | 9/2005 |
| JP | 2005-276285 | | 10/2005 |
| JP | 2006-079691 | | 3/2006 |
| JP | 2006-277838 | A | 10/2006 |
| JP | 2006-286114 | A | 10/2006 |
| JP | 2007-179680 | | 7/2007 |
| JP | 2009-087468 | | 4/2009 |
| JP | 2010-192065 | | 9/2010 |
| JP | 2010-218651 | | 9/2010 |
| JP | 2010-264683 | | 11/2010 |
| JP | 2011-084036 | | 4/2011 |
| JP | 2011-134372 | | 7/2011 |
| JP | 2012-043495 | | 3/2012 |
| JP | 2016-110680 | | 6/2016 |
| JP | 2016-524774 | A | 8/2016 |
| JP | 6010181 | | 10/2016 |
| JP | 2017-139044 | | 8/2017 |
| JP | 2017-168178 | | 9/2017 |
| JP | 2018-092693 | | 6/2018 |
| JP | 2018-170051 | | 11/2018 |
| JP | 2018-170053 | | 11/2018 |
| JP | 2018-181396 | | 11/2018 |
| JP | 6590102 | B1 | 10/2019 |
| JP | 2020-009522 | | 1/2020 |
| JP | 2021-034096 | | 3/2021 |
| JP | 2022-127014 | A | 8/2022 |
| WO | 2018/199105 | | 11/2018 |
| WO | 2018/203468 | | 11/2018 |
| WO | 2019/159466 | | 8/2019 |

OTHER PUBLICATIONS

International Search Report dated Sep. 20, 2022 in Application No. PCT/JP2022/028292.
Written Opinion of the International Searching Authority dated Sep. 20, 2022 in Application No. PCT/JP2022/028292.
Office Action issued Dec. 27, 2024 in U.S. Appl. No. 18/467,426.
Office Action issued Dec. 6, 2024 in U.S. Appl. No. 18/680,257.
Machine English Translation of JP2002-222515 A (H. Hitoshi et al., inventors)(2002).
Office Action issued May 11, 2023 in U.S. Appl. No. 17/954,719.
Office Action issued May 11, 2023 in U.S. Appl. No. 17/955,045.
Office Action issued May 11, 2023 in U.S. Appl. No. 17/955,035.
Office Action issued May 11, 2023 in U.S. Appl. No. 17/955,044.
Office Action issued May 11, 2023 in U.S. Appl. No. 17/955,156.
Notice of Allowance issued Oct. 12, 2023 in U.S. Appl. No. 17/954,719.
Notice of Allowance issued Oct. 18, 2023 in U.S. Appl. No. 17/955,035.
Notice of Allowance issued Oct. 18, 2023 in U.S. Appl. No. 17/955,044.
Notice of Allowance issued Oct. 18, 2023 in U.S. Appl. No. 17/955,045.
Notice of Allowance issued Oct. 18, 2023 in U.S. Appl. No. 17/955,156.
Office Action issued Aug. 19, 2024 in U.S. Appl. No. 18/498,739.
Office Action issued Aug. 19, 2024 in U.S. Appl. No. 18/421,455.
Office Action issued Aug. 19, 2024 in U.S. Appl. No. 18/517,870.
Office Action issued Aug. 19, 2024 in U.S. Appl. No. 18/517,638.
Office Action issued Aug. 19, 2024 in U.S. Appl. No. 18/516,132.
Office Action issued Aug. 19, 2024 in U.S. Appl. No. 18/421,433.
International Preliminary Report on Patentability dated Jan. 18, 2024 with a Translation of the Written Opinion of the International Searching Authority in Application No. PCT/JP2022/028291.
International Preliminary Report on Patentability dated Mar. 28, 2023 with a Translation of the Written Opinion of the International Searching Authority in Application No. PCT/JP2021/034157.
International Search Report issued Nov. 30, 2021 in International Application No. PCT/JP2021/034157.
International Search Report issued Sep. 20, 2022 in International Application No. PCT/JP2022/028291.
Notice of Allowance Issued Apr. 18, 2022 in U.S. Appl. No. 17/399,241.
Notice of Allowance issued Apr. 22, 2020 in U.S. Appl. No. 16/367,918.
Notice of Allowance issued Aug. 16, 2023 in U.S. Appl. No. 18/191,983.
Notice of Allowance issued Dec. 19, 2022 in U.S. Appl. No. 17/378,782.
Notice of Allowance issued Dec. 19, 2022 in U.S. Appl. No. 17/378,783.
Notice of Allowance Issued Feb. 11, 2022 in U.S. Appl. No. 16/777,368.
Notice of Allowance issued Feb. 24, 2022 in U.S. Appl. No. 16/857,502.
Notice of Allowance issued Feb. 3, 2022 in U.S. Appl. No. 16/874,170.
Notice of Allowance issued Feb. 4, 2022 in U.S. Appl. No. 16/825,425.
Notice of Allowance issued Feb. 8, 2022 in U.S. Appl. No. 16/777,418.
Notice of Allowance issued Feb. 9, 2022 in U.S. Appl. No. 16/368,199.
Notice of Allowance issued Jun. 2, 2021 in U.S. Appl. No. 16/777,418.
Notice of Allowance issued Mar. 14, 2022 in U.S. Appl. No. 17/329,275.
Notice of Allowance issued Mar. 31, 2021 in U.S. Appl. No. 16/777,368.
Notice of Allowance issued May 21, 2021 in U.S. Appl. No. 16/777,368.
Notice of Allowance issued Oct. 1, 2021 in U.S. Appl. No. 16/777,368.
Notice of Allowance issued Oct. 21, 2022 in U.S. Appl. No. 16/777,418.
Notice of Allowance issued Oct. 21, 2022 in U.S. Appl. No. 16/857,502.
Notice of Allowance issued Oct. 24, 2023 in U.S. Appl. No. 17/955,251.
Notice of Allowance issued Sep. 9, 2021 in U.S. Appl. No. 16/857,502.
Office Action issued Apr. 19, 2021 in U.S. Appl. No. 16/857,502.
Office Action issued Apr. 8, 2021 in U.S. Appl. No. 16/368,199.
Office Action issued Aug. 19, 2024 in U.S. Appl. No. 18/422,850.
Office Action issued Aug. 19, 2024 in U.S. Appl. No. 18/524,342.
Office Action issued Aug. 19, 2024 in U.S. Appl. No. 18/524,922.
Office Action issued Aug. 25, 2022 in U.S. Appl. No. 17/378,782.
Office Action issued Aug. 25, 2022 in U.S. Appl. No. 17/378,783.
Office Action issued Dec. 15, 2020 in U.S. Appl. No. 16/777,368.
Office Action issued Feb. 16, 2021 in U.S. Appl. No. 16/777,418.
Office Action issued Jan. 11, 2022 in Japanese Application No. 2019-054337, corresponds to U.S. Appl. No. 16/825,425.
Office Action issued Jan. 11, 2022 in Japanese Application No. 2019-064370, corresponds to U.S. Appl. No. 16/831,158.
Office Action issued Jan. 3, 2022 in U.S. Appl. No. 17/399,241.
Office Action issued Jul. 21, 2020 in U.S. Appl. No. 16/777,418.
Office Action issued Jul. 22, 2020 in U.S. Appl. No. 16/777,368.
Office Action issued Mar. 3, 2022 in U.S. Appl. No. 17/378,782.
Office Action issued Mar. 3, 2022 in U.S. Appl. No. 17/378,783.
Office Action issued May 25, 2023 in U.S. Appl. No. 17/955,251.
Office Action issued Nov. 21, 2023 in Japanese Application No. 2022-553821.
Office Action issued Nov. 30, 2021 in U.S. Appl. No. 17/329,275.
Office Action issued Nov. 8, 2019 in U.S. Appl. No. 16/367,918.
Office Action issued Oct. 27, 2020 in U.S. Appl. No. 16/368,199.
Office Action issued Oct. 27, 2020 in U.S. Appl. No. 16/777,418.
Office Action issued Sep. 13, 2021 in U.S. Appl. No. 16/825,425.
Office Action issued Sep. 27, 2021 in U.S. Appl. No. 16/874,170.

(56) References Cited

OTHER PUBLICATIONS

Written Opinion issued Nov. 30, 2021 in International Application No. PCT/JP2021/034157.
Notice of Allowance issued Jun. 1, 2023 in U.S. Appl. No. 17/953,953.
Notice of Allowance issued Oct. 24, 2023 in U.S. Appl. No. 17/955,113.
Notice of Allowance issued Oct. 25, 2023 in U.S. Appl. No. 17/954,800.
Notice of Allowance issued Oct. 25, 2023 in U.S. Appl. No. 17/955,808.
Notice of Allowance issued Sep. 13, 2023 in U.S. Appl. No. 17/953,953.
Office Action issued Aug. 19, 2024 in U.S. Appl. No. 18/524,724.
Office Action issued May 25, 2023 in U.S. Appl. No. 17/954,808.
Office Action issued May 25, 2023 in U.S. Appl. No. 17/955,113.
Office Action issued May 25, 2023 in U.S. Appl. No. 17/954,800.
International Search Report issued Feb. 14, 2023 in International Application No. PCT/JP2022/043998, corresponds to U.S. Appl. No. 18/680,257.
Written Opinion issued Feb. 14, 2023 in International Application No. PCT/JP2022/043998, corresponds to U.S. Appl. No. 18/680,257.
International Preliminary Report on Patentability dated May 2, 2024 with a Translation of the Written Opinion of the International Searching Authority in Application No. PCT/JP2022/043998, corresponds to U.S. Appl. No. 18/680,257.

* cited by examiner

RUNNING DIRECTION
OF MAGNETIC TAPE

MAGNETIC TAPE HAVING CHARACTERIZED MAGNETIC LAYER, MAGNETIC TAPE CARTRIDGE, AND MAGNETIC TAPE APPARATUS

CROSS-REFERENCE TO RELATED APPLICATIONS

This application is a Continuation of PCT International Application No. PCT/JP2022/028292 filed on Jul. 21, 2022, which claims priority under 35 U.S.C. § 119(a) to Japanese Patent Application No. 2021-121714 filed on Jul. 26, 2021 and Japanese Patent Application No. 2021-165991 filed on Oct. 8, 2021. Each of the above applications is hereby expressly incorporated by reference, in its entirety, into the present application.

BACKGROUND OF THE INVENTION

1. Field of the Invention

The present invention relates to a magnetic tape, a magnetic tape cartridge, and a magnetic tape apparatus.

2. Description of the Related Art

There are two types of magnetic recording media: a tape shape and a disk shape, and a tape-shaped magnetic recording medium, that is, a magnetic tape is mainly used for data storage applications such as data backup and archiving (for example, see JP2016-524774A and US2019/0164573A1)

SUMMARY OF THE INVENTION

Recording of data on a magnetic tape is usually performed by running the magnetic tape in a magnetic tape apparatus and recording the data on a data band by making a magnetic head follow the data band of the magnetic tape. Thereby, a data track is formed in the data band. In addition, in a case where the recorded data is reproduced, the data recorded on the data band is read by running the magnetic tape in the magnetic tape apparatus and by making the magnetic head follow the data band of the magnetic tape.

In order to increase an accuracy of the magnetic head following the data band of the magnetic tape in recording and/or reproduction as described above, a system for performing head tracking using a servo signal (hereinafter, it is described as a "servo system") has been put into practical use.

Further, it has been proposed to acquire information on dimensions (contraction, expansion, or the like) in a width direction of the magnetic tape during running by using a servo signal and to change an angle (hereinafter, also referred to as a "head tilt angle") at which an axial direction of a module of a magnetic head is tilted against the width direction of the magnetic tape according to the acquired dimension information (see JP2016-524774A and US2019/0164573A1, for example, paragraphs 0059 to 0067 and 0084 of JP2016-524774A). During recording or reproduction, in a case where the magnetic head for recording or reproducing data records or reproduces data while being deviated from a target track position due to the width deformation of the magnetic tape, a phenomenon such as overwriting of recorded data or reproduction failure may occur. The present inventor considers that changing the angle as described above is one of methods for suppressing the occurrence of such a phenomenon.

For magnetic recording, it is required to obtain excellent electromagnetic conversion characteristics. For example, assuming that the head tilt angle is changed as described above, a magnetic tape having little deterioration in electromagnetic conversion characteristics in a case of recording and/or reproducing data at different head tilt angles is desirable.

One aspect of the present invention is to provide a magnetic tape having little deterioration in electromagnetic conversion characteristics in a case of recording and/or reproducing data at different head tilt angles.

One aspect of the present invention is as follows.

[1] A magnetic tape comprising: a non-magnetic support; and a magnetic layer containing a ferromagnetic powder, in which, in an environment of a temperature of 23° C. and a relative humidity of 50%, an AlFeSil abrasion value$_{45°}$ of a magnetic layer surface measured at a tilt angle of 45° of an AlFeSil square bar is 20 μm or more and 50 μm or less, standard deviation of an AlFeSil abrasion value (hereinafter, also simply referred to as "standard deviation of an AlFeSil abrasion value") of the magnetic layer surface measured at each of tilt angles of 0°, 15°, 30°, and 45° of the AlFeSil square bar is 30 μm or less, and the tilt angle of the AlFeSil square bar is an angle formed by a longitudinal direction of the AlFeSil square bar and a width direction of the magnetic tape.

[2] The magnetic tape according to [1], in which the standard deviation of the AlFeSil abrasion value is 15 μm or more and 30 μm or less.

[3] The magnetic tape according to [1] or [2], in which standard deviation of a curvature in a longitudinal direction of the magnetic tape (hereinafter, simply referred to as "standard deviation of a curvature") is 5 mm/m or less.

[4] The magnetic tape according to any one of [1] to [3], in which the magnetic layer contains one or more non-magnetic powders.

[5] The magnetic tape according to [4], in which the non-magnetic powder includes an alumina powder.

[6] The magnetic tape according to any one of [1] to [5], further comprising: a non-magnetic layer containing a non-magnetic powder between the non-magnetic support and the magnetic layer.

[7] The magnetic tape according to any one of [1] to [6], further comprising: a back coating layer containing a non-magnetic powder on a surface side of the non-magnetic support opposite to a surface side having the magnetic layer.

[8] The magnetic tape according to any one of [1] to [7], in which a vertical squareness ratio of the magnetic tape is 0.60 or more.

[9] A magnetic tape cartridge comprising: the magnetic tape according to any one of [1] to [8].

[10] A magnetic tape apparatus comprising: the magnetic tape according to any one of [1] to [8].

[11] The magnetic tape apparatus according to [10], further comprising: a magnetic head, in which the magnetic head has a module including an element array with a plurality of magnetic head elements between a pair of servo signal reading elements, and the magnetic tape apparatus changes an angle θ formed by an axis of the element array with respect to a width direction of the magnetic tape during running of the magnetic tape in the magnetic tape apparatus.

According to the present invention, it is possible to provide a magnetic tape having little deterioration in electromagnetic conversion characteristics in a case of recording and/or reproducing data at different head tilt angles. In addition, according to one aspect of the present invention, it is possible to provide a magnetic tape cartridge and a magnetic tape apparatus which include the magnetic tape.

DESCRIPTION OF THE PREFERRED EMBODIMENTS

[Magnetic Tape]

Figure 1:
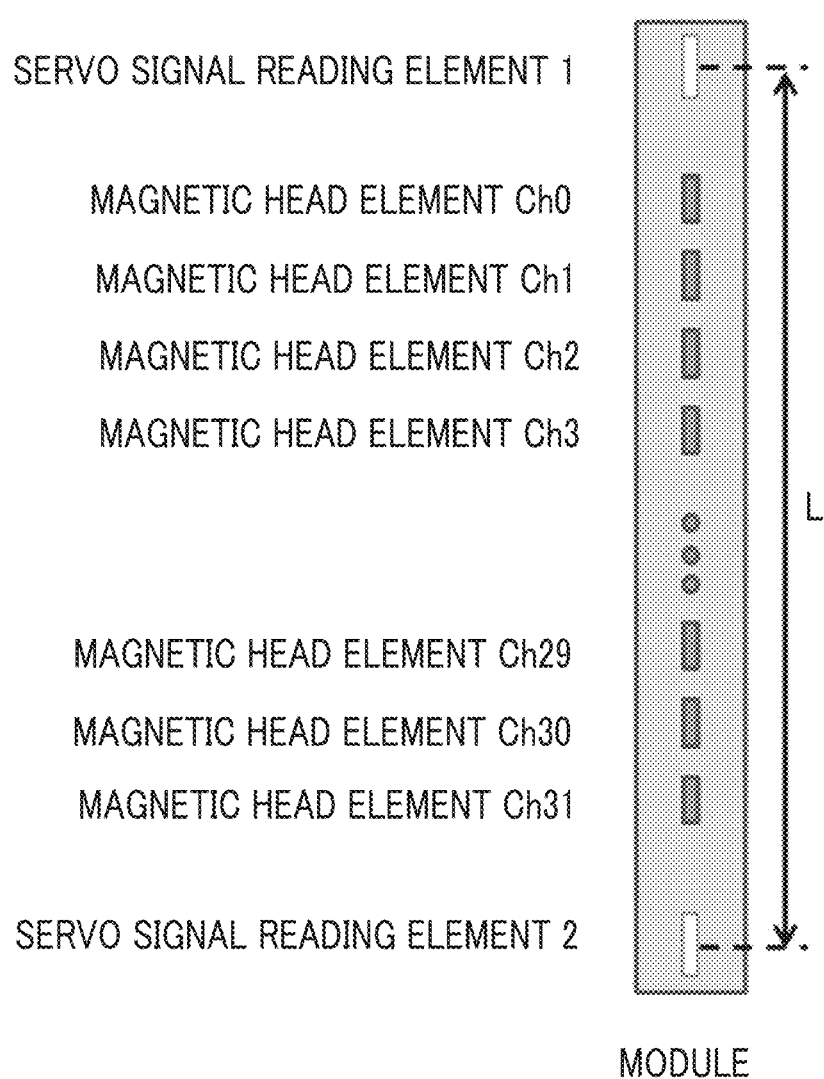
FIG. 1 is a schematic view showing an example of a module of a magnetic head.

One aspect of the present invention relates to a magnetic tape including a non-magnetic support and a magnetic layer containing a ferromagnetic powder. In an environment of a temperature of 23° C. and a relative humidity of 50%, an AlFeSil abrasion values of a magnetic layer surface measured at a tilt angle of 45° of an AlFeSil square bar of the magnetic tape is 20 μm or more and 50 μm or less, standard deviation of an AlFeSil abrasion value of the magnetic layer surface measured at each of tilt angles of 0°, 15°, 30°, and 45° of the AlFeSil square bar is 30 μm or less. In the present invention and the present specification, the term "magnetic layer surface (surface of the magnetic layer)" has the same meaning as the surface of the magnetic tape on the magnetic layer side.

Description of Head Tilt Angle

Hereinafter, prior to the description of the tilt angle of the AlFeSil square bar, a configuration of the magnetic head, a head tilt angle, and the like will be described. Further, the reason why it is considered that the phenomenon occurring during the recording or during the reproduction described above can be suppressed by tilting the axial direction of the module of the magnetic head against the width direction of the magnetic tape during running of the magnetic tape will also be described below.

The magnetic head may have one or more modules including an element array with a plurality of magnetic head elements between a pair of servo signal reading elements, and may have two or more or three or more modules. The total number of such modules may be, for example, 5 or less, 4 or less, or 3 or less, and the modules as many as the number exceeding the total number illustrated here may be included in the magnetic head. Arrangement examples of a plurality of modules include "recording module—reproducing module" (total number of modules: 2), and "recording module—reproducing module—recording module" (total number of modules: 3). Note that the present invention is not limited to the examples shown here.

Each module can include an element array with a plurality of magnetic head elements between a pair of servo signal reading elements, that is, an arrangement of the elements. A module having a recording element as the magnetic head element is a recording module for recording data on the magnetic tape. A module having a reproducing element as the magnetic head element is a reproducing module for reproducing data recorded on the magnetic tape. In the magnetic head, a plurality of modules are arranged, for example, in a recording and reproducing head unit such that axes of the element arrays of the respective modules are oriented in parallel. Such a term "parallel" does not necessarily mean only parallel in a strict sense, but includes a range of errors normally allowed in the technical field to which the present invention belongs. The range of errors can mean, for example, a range less than strictly parallel±10°.

In each element array, the pair of servo signal reading elements and the plurality of magnetic head elements (that is, the recording element or the reproducing element) are usually arranged linearly to be spaced from each other. Here, the term "arranged linearly" means that each magnetic head element is arranged on a straight line connecting a central portion of one servo signal reading element and a central portion of the other servo signal reading element. The term "axis of the element array" in the present invention and the present specification means a straight line connecting a central portion of one servo signal reading element and a central portion of the other servo signal reading element.

Next, a configuration of a module and the like will be further described with reference to the drawings. Note that the form shown in the drawings is an example and does not limit the present invention.

FIG. 1 is a schematic view showing an example of the module of the magnetic head. The module shown in FIG. 1 has a plurality of magnetic head elements between a pair of servo signal reading elements (servo signal reading elements 1 and 2). The magnetic head element is also referred to as a "channel". "Ch" in the figure is an abbreviation for channel. The module shown in FIG. 1 has a total of 32 magnetic head elements from Ch0 to Ch31.

In FIG. 1, "L" represents a distance between a pair of servo signal reading elements, that is, a distance between one servo signal reading element and the other servo signal reading element. In the module shown in FIG. 1, "L" represents a distance between the servo signal reading element 1 and the servo signal reading element 2. Specifically, it is a distance between a central portion of the servo signal reading element 1 and a central portion of the servo signal reading element 2. Such a distance can be measured, for example, by an optical microscope or the like.

Figure 2:
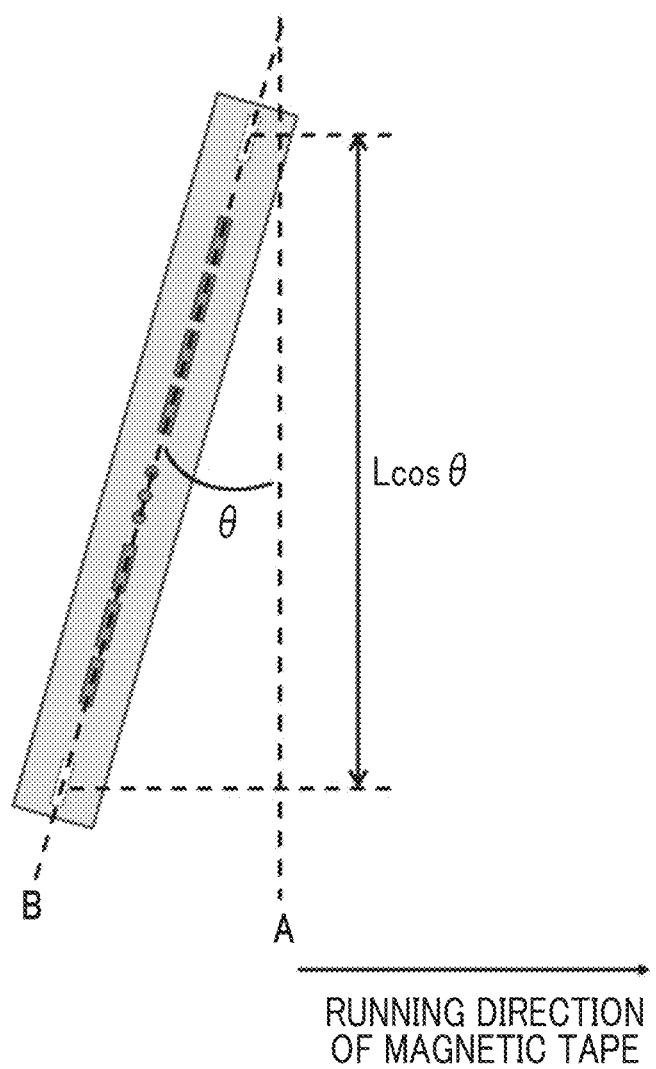
FIG. 2 is an explanatory diagram of a relative positional relationship between a module and a magnetic tape during magnetic tape running in a magnetic tape apparatus.

FIG. 2 is an explanatory diagram of a relative positional relationship between the module and the magnetic tape during running of the magnetic tape in the magnetic tape apparatus. In FIG. 2, the dotted line A indicates the width direction of the magnetic tape. The dotted line B indicates the axis of the element array. The angle θ can be said to be a head tilt angle during running of the magnetic tape, and is an angle formed by the dotted line A and the dotted line B. In a case where the angle θ is 0° during running of the magnetic tape, a distance in the magnetic tape width direction between one servo signal reading element and the other servo signal reading element in the element array (hereinafter, also referred to as "effective distance between servo signal reading elements") is "L". On the other hand, in a case where the angle θ exceeds 0°, the effective distance between the servo signal reading elements is "$L\cos\theta$", where $L\cos\theta$ is smaller than L. That is, "$L\cos\theta<L$".

As described above, during recording or reproduction, in a case where the magnetic head for recording or reproducing data records or reproduces data while being deviated from a target track position due to the width deformation of the magnetic tape, a phenomenon such as overwriting of recorded data or reproduction failure may occur. For example, in a case where the width of the magnetic tape contracts or expands, a phenomenon may occur in which the magnetic head element, which should perform recording or reproduction at a target track position, performs recording or reproduction at a different track position. In addition, in a case where the width of the magnetic tape expands, a phenomenon may occur in which the effective distance between the servo signal reading elements becomes shorter than an interval between two servo bands adjacent to each other with the data band interposed therebetween (also referred to as "servo band interval" or "interval between servo bands", specifically, a distance between the two servo bands in the width direction of the magnetic tape), and data is not recorded or reproduced in a portion near an edge of the magnetic tape.

On the other hand, in a case where the element array is tilted at an angle $\theta$ exceeding 0°, the effective distance between the servo signal reading elements becomes "$L\cos\theta$" as described above. The larger the value of $\theta$, the smaller the value of $L\cos\theta$, and the smaller the value of $\theta$, the larger the value of $L\cos\theta$. Therefore, by changing the value of $\theta$ according to a degree of the dimension change (that is, contraction or extension) in the width direction of the magnetic tape, it is possible to make the effective distance between the servo signal reading elements approximate to or match with the interval between the servo bands. As a result, it is possible to prevent a phenomenon such as overwriting of recorded data or reproduction failure due to the fact that the magnetic head for recording or reproducing data records or reproduces data while being deviated from a target track position due to the width deformation of the magnetic tape during recording or reproduction, or to reduce a frequency of the occurrence of the phenomenon.

Figure 3:
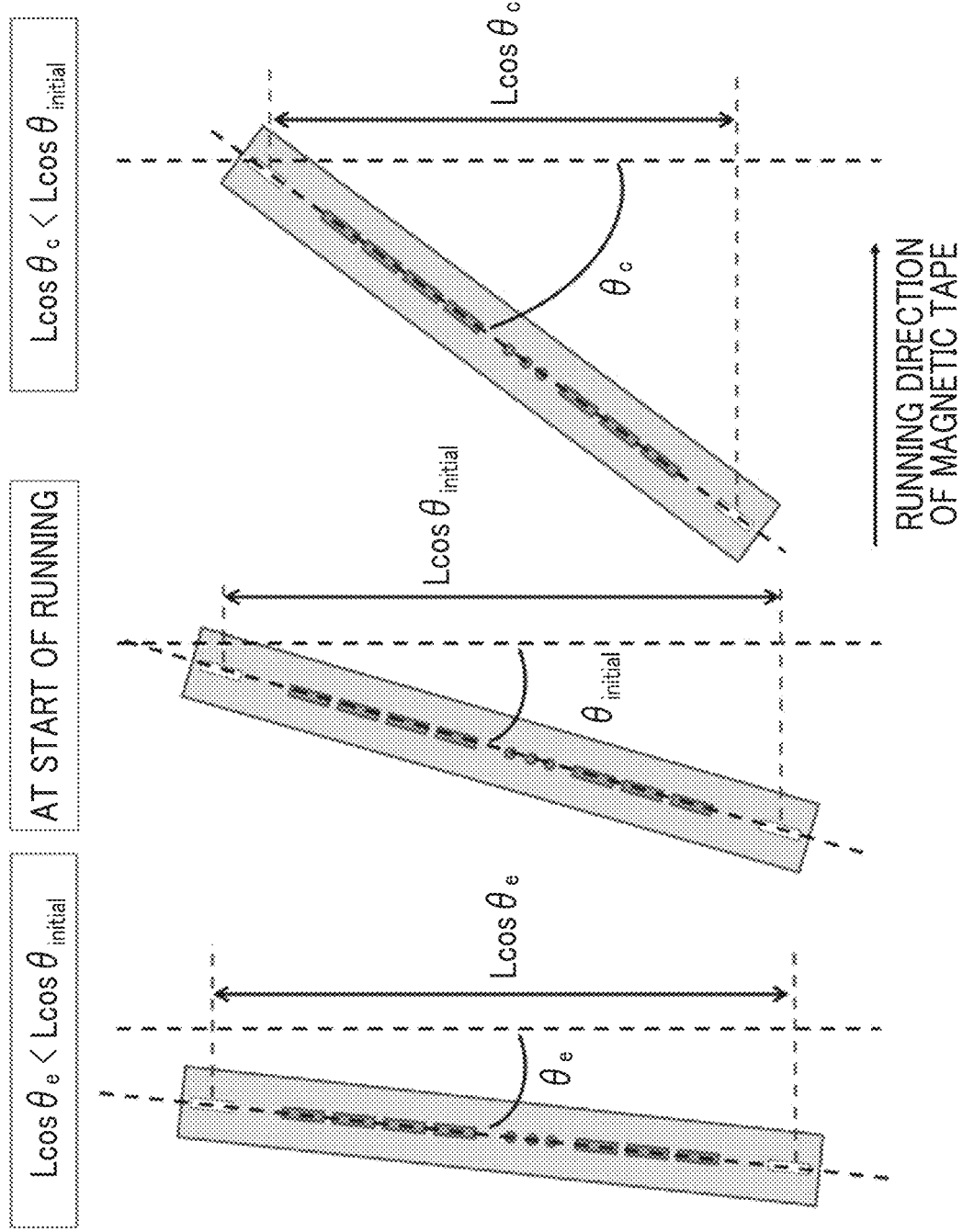
FIG. 3 is an explanatory diagram relating to a change in an angle θ during magnetic tape running.

FIG. 3 is an explanatory diagram relating to a change in the angle $\theta$ during running of the magnetic tape.

$\theta_{initial}$, which is an angle $\theta$ at the start of running, can be set to, for example, 0° or more or more than 0°.

In FIG. 3, the central figure shows a state of the module at the start of running.

In FIG. 3, the right figure shows a state of the module in a case where the angle $\theta$ is set to an angle $\theta_c$, which is an angle larger than $\theta_{initial}$. The effective distance between the servo signal reading elements $L\cos\theta_c$ is a value smaller than $L\cos\theta_{initial}$ at the start of running of the magnetic tape. In a case where the width of the magnetic tape contracts during running of the magnetic tape, it is preferable to perform such angle adjustment.

On the other hand, in FIG. 3, the left figure shows a state of the module in a case where the angle $\theta$ is set to an angle $\theta_e$, which is an angle smaller than $\theta_{initial}$. The effective distance between the servo signal reading elements $L\cos\theta_e$ is a value larger than $L\cos\theta_{initial}$ at the start of running of the magnetic tape. In a case where the width of the magnetic tape expands during running of the magnetic tape, it is preferable to perform such angle adjustment.

As described above, changing the head tilt angle during running of the magnetic tape can contribute to prevention of the phenomenon such as overwriting of recorded data or reproduction failure due to the fact that the magnetic head for recording or reproducing data records or reproduces data while being deviated from a target track position due to the width deformation of the magnetic tape during recording or reproduction, or can contribute to reduction of the frequency of the occurrence of the phenomenon.

On the other hand, recording of data on the magnetic tape and reproduction of the recorded data are usually performed as the magnetic layer surface of the magnetic tape and a magnetic head come into contact with each other to be slid on each other. The present inventor considered that in a case where the head tilt angle during such sliding is different, a contact state between the magnetic head and the magnetic layer surface can change, which can be a factor in deterioration in electromagnetic conversion characteristics. Specifically, the present inventor supposed that, in a case where the head tilt angle is different, a degree of abrasion of the magnetic head caused by the contact with the magnetic layer surface significantly changes, and accordingly, the electromagnetic conversion characteristics deteriorates.

Based on the above supposition, the present inventor has made extensive studies. As a result, regarding abrasion characteristics of the magnetic tape, the present inventor newly found that by setting the AlFeSil abrasion value$_{45°}$ measured at the tilt angle of 45° of the AlFeSil square bar in an environment of a temperature of 23° C. and a relative humidity of 50% and the standard deviation of the AlFeSil abrasion value of the magnetic layer surface measured at each of the tilt angles of 0°, 15°, 30°, and 45° of the AlFeSil square bar to the ranges described above, respectively, it is possible to suppress deterioration in electromagnetic conversion characteristics in a case of recording and/or reproducing data at different head tilt angles. Hereinafter, the deterioration in electromagnetic conversion characteristics in a case of recording and/or reproducing data at different head tilt angles is also simply referred to as "deterioration in electromagnetic conversion characteristics". The temperature and humidity of a measurement environment are employed as exemplary values of the temperature and humidity of the use environment of the magnetic tape. Therefore, an environment in which data is recorded on the magnetic tape and the recorded data is reproduced is not limited to the temperature and humidity environment. The tilt angle of the AlFeSil square bar in measuring the AlFeSil abrasion value was also employed as an illustrative value of the angle that could be employed in recording and/or reproducing data by changing the head tilt angle during running of the magnetic tape. Therefore, the head tilt angle in a case where data is recorded on the magnetic tape and the recorded data is reproduced is also not limited to the angle described above. In addition, the present invention is not limited by supposition of the present inventor described in the present specification.

AlFeSil Abrasion Value$_{45°}$ and Standard Deviation of AlFeSil Abrasion Value (Measurement Method)

In the present invention and the present specification, the AlFeSil abrasion value at each of tilt angles of 0°, 15°, 30°, and 45° of the AlFeSil square bar is a value to be measured by the following method in an environment of a temperature of 23° C. and a relative humidity of 50%.

An abrasion width of an AlFeSil square bar when the magnetic tape to be measured is run under the following running conditions using a reel tester is measured. The AlFeSil square bar is a square bar made of AlFeSil, which is a Sendust-based alloy. For the evaluation, an AlFeSil square bar specified in European Computer Manufacturers Association (ECMA)-288/Annex H/H2 is used. The abrasion width of the AlFeSil square bar is obtained as an abrasion width described in a paragraph 0015 of JP2007-026564A, based on FIG. 1 of the same publication, by observing an edge of the AlFeSil square bar from above using an optical microscope.

The tilt angle of the AlFeSil square bar (hereinafter, also simply referred to as a "tilt angle") is an angle formed by the longitudinal direction of the AlFeSil square bar and the width direction of the magnetic tape, and is defined in a range of 0° to 90°. A case where the longitudinal direction of the AlFeSil square bar and the width direction of the magnetic tape coincide with each other is defined as the tilt angle 0° of the AlFeSil square bar, and a case where the longitudinal direction of the AlFeSil square bar and the longitudinal direction of the magnetic tape coincide with each other is defined as the tilt angle 90° of the AlFeSil square bar.

Running Conditions

At the tilt angle of 0°, 15°, 30°, or 45° of the AlFeSil square bar, the magnetic layer surface of the magnetic tape is brought into contact with one ridge side of the AlFeSil square bar at a wrap angle of 12°. In this state, a portion of the magnetic tape to be measured over a length of 580 m in the longitudinal direction is run at a speed of 3 m/sec to make one reciprocation.

In the measurement of the AlFeSil abrasion value at each tilt angle, the tension applied in the longitudinal direction of the magnetic tape during the above running is set to 1.0 N. Here, a value of the tension applied in the longitudinal direction of the magnetic tape during running was a set value of the reel tester. The AlFeSil abrasion width thus measured after one reciprocation is defined as the AlFeSil abrasion value at each tilt angle. One unused AlFeSil square bar that is not used in the measurement of the AlFeSil abrasion value is prepared. The measurement of the AlFeSil abrasion value at the above four different tilt angles is performed in a random order by bringing the magnetic layer surface into contact with one ridge side of the four ridge sides of the AlFeSil abrasion value. The measurement of the AlFeSil abrasion value at each tilt angle is executed on different portions of the magnetic tape to be measured. In addition, before the measurement at each tilt angle, the magnetic tape to be measured is left in the measurement environment for 24 hours or more in order to be adapted to the measurement environment.

Among the AlFeSil abrasion values obtained by the above method, the AlFeSil abrasion value obtained by the measurement at the tilt angle of 45° is the AlFeSil abrasion value$_{45°}$. The standard deviation (that is, a positive square root of the dispersion) of the AlFeSil abrasion value obtained at the four different tilt angles is set to the standard deviation of the AlFeSil abrasion value of the magnetic tape to be measured.

(AlFeSil Abrasion Value$_{45°}$)

Regarding the abrasion characteristics of the magnetic tape, the AlFeSil abrasion value$_{45°}$ is 20 μm or more and 50 μm or less, from the viewpoint of suppressing deterioration in electromagnetic conversion characteristics in a case of recording and/or reproducing data at different head tilt angles. From the viewpoint of further suppressing the deterioration in electromagnetic conversion characteristics, the AlFeSil abrasion values is preferably 45 μm or less, more preferably 40 μm or less, and still more preferably 35 μm or less. From the same viewpoint, the AlFeSil abrasion value$_{45°}$ is preferably 23 μm or more, and more preferably 25 μm or more.

(Standard Deviation of AlFeSil Abrasion Value)

The standard deviation of the AlFeSil abrasion value of the magnetic tape is 30 μm or less, preferably 28 μm or less, more preferably 25 μm or less, still more preferably 23 μm or less, and still more preferably 20 μm or less, from the viewpoint of suppressing deterioration in electromagnetic conversion characteristics in a case of recording and/or reproducing data at different head tilt angles. The standard deviation of the AlFeSil abrasion value may be, for example, 0 μm or more, more than 0 μm, 1 μm or more, 3 μm or more, 5 μm or more, 7 μm or more, 10 μm or more, 12 μm or more, or 15 μm or more. It is preferable that the value of the standard deviation of the AlFeSil abrasion value is small, from the viewpoint of further suppressing the deterioration in electromagnetic conversion characteristics.

The abrasion characteristics of the magnetic tape can be adjusted, for example, by the type of component used to manufacture the magnetic layer. Details of this point will be described below.

Standard Deviation of Curvature

Next, standard deviation of a curvature will be described.

In the present invention and the present specification, the curvature of the magnetic tape in the longitudinal direction is a value obtained by the following method in an environment of an atmosphere temperature of 23° C. and a relative humidity of 50%. The magnetic tape is generally distributed while being accommodated in the magnetic tape cartridge. As the magnetic tape to be measured, a magnetic tape taken out from an unused magnetic tape cartridge that is not attached to the magnetic tape apparatus is used.

Figure 4:
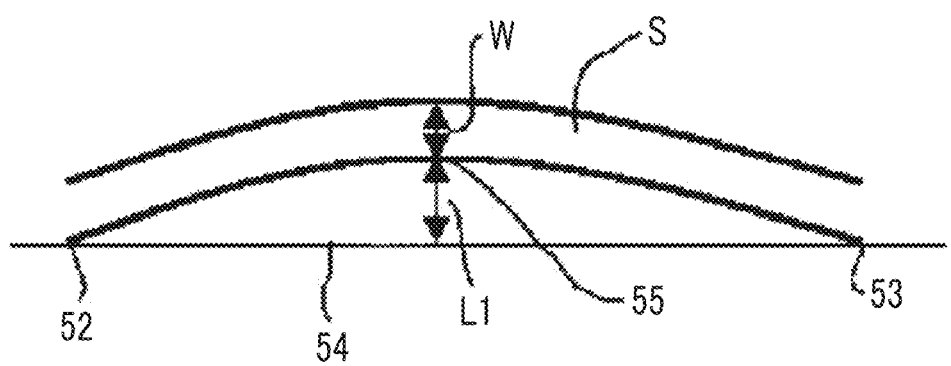
FIG. 4 is an explanatory diagram of a curvature of the magnetic tape in a longitudinal direction.

FIG. 4 is an explanatory diagram of the curvature of the magnetic tape in the longitudinal direction.

A tape sample having a length of 100 m in the longitudinal direction is cut out from a randomly selected portion of the magnetic tape to be measured. One end of this tape sample is defined as a position 0 m, and a position spaced apart from the one end toward the other end by D meters (Dm) in the longitudinal direction is defined as a position of Dm. Therefore, a position spaced by 10 m in the longitudinal direction is a position of 10 m, a position spaced by 20 m is a position of 20 m, and, in order, a position of 30 m, a position of 40 m, a position of 50 m, a position of 60 m, a position of 70 m, a position of 80 m, a position of 90 m, and a position of 100 m are determined at 10 m intervals.

A tape sample having a length of 1 m from the position of 0 m to the position of 1 m is cut out. This tape sample is used as a tape sample for measuring the curvature at the position of 0 m.

A tape sample having a length of 1 m from the position of 10 m to the position of 11 m is cut out. This tape sample is used as a tape sample for measuring the curvature at the position of 10 m.

A tape sample having a length of 1 m from the position of 20 m to the position of 21 m is cut out. This tape sample is used as a tape sample for measuring the curvature at the position of 20 m.

A tape sample having a length of 1 m from the position of 30 m to the position of 31 m is cut out. This tape sample is used as a tape sample for measuring the curvature at the position of 30 m.

A tape sample having a length of 1 m from the position of 40 m to the position of 41 m is cut out. This tape sample is used as a tape sample for measuring the curvature at the position of 40 m.

A tape sample having a length of 1 m from the position of 50 m to the position of 51 m is cut out. This tape sample is used as a tape sample for measuring the curvature at the position of 50 m.

A tape sample having a length of 1 m from the position of 60 m to the position of 61 m is cut out. This tape sample is used as a tape sample for measuring the curvature at the position of 60 m.

A tape sample having a length of 1 m from the position of 70 m to the position of 71 m is cut out. This tape sample is used as a tape sample for measuring the curvature at the position of 70 m.

A tape sample having a length of 1 m from the position of 80 m to the position of 81 m is cut out. This tape sample is used as a tape sample for measuring the curvature at the position of 80 m.

A tape sample having a length of 1 m from the position of 90 m to the position of 91 m is cut out. This tape sample is used as a tape sample for measuring the curvature at the position of 90 m.

A tape sample having a length of 1 m from the position of 99 m to the position of 100 m is cut out. This tape sample is used as a tape sample for measuring the curvature at the position of 100 m.

The tape sample at each position is hung for 24 hours±4 hours in a tension-free state by holding an upper end portion with a holding member (clip or the like) by setting the longitudinal direction as the vertical direction. After that, within 1 hour, the following measurement is performed.

As shown in FIG. 4, the tape piece is placed on a plane in a tension-free state. The tape piece may be placed on a plane with the surface on the magnetic layer side facing upward, or may be placed on a plane with the other surface facing upward. In FIG. 4, S indicates a tape sample and W indicates the width direction of the tape sample. Using an optical microscope, a distance L1 (unit: mm) that is a shortest distance between a virtual line 54 connecting both end portions 52 and 53 of the tape sample S and a maximum curved portion 55 in the longitudinal direction of the tape sample S is measured. FIG. 4 shows an example in which the tape sample is curved upward on a paper surface. Even in a case where the tape sample is curved downward, the distance L1 (mm) is measured in the same manner. The distance L1 is shown as a positive value regardless of which side is curved. In a case where no curve in the longitudinal direction is confirmed, the L1 is set to 0 (zero) mm.

In this way, standard deviation (that is, a positive square root of the dispersion) of the curvature L1 measured for a total of 11 positions from the position of 0 m to the position of 100 m is calculated as standard deviation (unit: mm/m) of the curvature of the magnetic tape to be measured in the longitudinal direction.

In the above magnetic tape, the standard deviation of the curvature obtained by the above method may be, for example, 7 mm/m or less, 6 mm/m or less, and, from the viewpoint of further suppressing the deterioration in electromagnetic conversion characteristics, the standard deviation is preferably 5 mm/m or less, more preferably 4 mm/m or less, and still more preferably 3 mm/m or less. The standard deviation of the curvature of the magnetic tape may be, for example, 0 mm/m or more, more than 0 mm/m, 1 mm/m or more, or 2 mm/m or more. It is preferable that the value of the standard deviation of the curvature is small, from the viewpoint of further suppressing the deterioration in electromagnetic conversion characteristics.

The standard deviation of the curvature can be controlled by adjusting the manufacturing conditions of the manufacturing step of the magnetic tape. This point will be described below in detail.

Hereinafter, the magnetic tape will be described in detail.
<Magnetic Layer>
(Ferromagnetic Powder)

As a ferromagnetic powder included in the magnetic layer, a well-known ferromagnetic powder as a ferromagnetic powder used in magnetic layers of various magnetic recording media can be used alone or in combination of two or more. From the viewpoint of improving recording density, it is preferable to use a ferromagnetic powder having a small average particle size. From this point, the average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from the viewpoint of magnetization stability, the average particle size of the ferromagnetic powder is preferably 5 nm or more, more preferably 8 nm or more, still more preferably 10 nm or more, still more preferably 15 nm or more, and still more preferably 20 nm or more.

Hexagonal Ferrite Powder

Preferred specific examples of the ferromagnetic powder include a hexagonal ferrite powder. For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

In the present invention and the present specification, the term "hexagonal ferrite powder" refers to a ferromagnetic powder in which a hexagonal ferrite crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite crystal structure in an X-ray diffraction spectrum obtained by X-ray diffraction analysis, it is determined that the hexagonal ferrite crystal structure is detected as the main phase. In a case where only a single structure is detected by X-ray diffraction analysis, this detected structure is taken as the main phase. The hexagonal ferrite crystal structure includes at least an iron atom, a divalent metal atom, and an oxygen atom, as a constituent atom. The divalent metal atom is a metal atom that can be a divalent cation as an ion, and examples thereof may include an alkaline earth metal atom such as a strontium atom, a barium atom, and a calcium atom, and a lead atom. In the present invention and the present specification, a hexagonal strontium ferrite powder refers to a powder in which a main divalent metal atom is a strontium atom, and a hexagonal barium ferrite powder refers to a powder in which a main divalent metal atom is a barium atom. The main divalent metal atom refers to a divalent metal atom that accounts for the most on an at % basis among the divalent metal atoms included in the powder. Note that a rare earth atom is not included in the above divalent metal atom. The term "rare earth atom" in the present invention and the present specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder, which is one aspect of the hexagonal ferrite powder, will be described in more detail.

An activation volume of the hexagonal strontium ferrite powder is preferably in a range of 800 to 1600 nm$^3$. The finely granulated hexagonal strontium ferrite powder having an activation volume in the above range is suitable for manufacturing a magnetic tape exhibiting excellent electromagnetic conversion characteristics. The activation volume of the hexagonal strontium ferrite powder is preferably 800 nm$^3$ or more, and may be, for example, 850 nm$^3$ or more. Further, from the viewpoint of further improving the electromagnetic conversion characteristics, the activation volume of the hexagonal strontium ferrite powder is more preferably 1500 nm$^3$ or less, still more preferably 1400 nm$^3$ or less, still more preferably 1300 nm$^3$ or less, still more preferably 1200 nm$^3$ or less, and still more preferably 1100 nm$^3$ or less. The same applies to an activation volume of the hexagonal barium ferrite powder.

The term "activation volume" refers to a unit of magnetization reversal and is an index indicating the magnetic size of a particle. An activation volume described in the present invention and the present specification and an anisotropy constant Ku which will be described below are values obtained from the following relational expression between a coercivity Hc and an activation volume V, by performing measurement in a coercivity Hc measurement portion at a magnetic field sweep rate of 3 minutes and 30 minutes using a vibrating sample magnetometer (measurement temperature: 23° C.±1° C.). For a unit of the anisotropy constant Ku, 1 erg/cc=1.0×10$^{-1}$ J/m$^3$.

$$Hc = 2Ku/Ms\{1 - [(kT/KuV)\ln(At/0.693)]^{1/2}\}$$

[In the above expression, Ku: anisotropy constant (unit: J/m$^3$), Ms: saturation magnetization (unit: kA/m), k: Boltzmann constant, T: absolute temperature (unit: K), V: activation volume (unit: cm$^3$), A: spin precession frequency (unit: s$^{-1}$), t: magnetic field reversal time (unit: s)]

An index for reducing thermal fluctuation, in other words, for improving the thermal stability may include the anisotropy constant Ku. The hexagonal strontium ferrite powder preferably has Ku of 1.8×10$^5$ J/m$^3$ or more, and more preferably has Ku of 2.0×10$^5$ J/m$^3$ or more. Ku of the hexagonal strontium ferrite powder may be, for example, 2.5×10$^5$ J/m$^3$ or less. Here, since higher Ku means higher thermal stability, which is preferable, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In one aspect, the hexagonal strontium ferrite powder including a rare earth atom may have a rare earth atom surface layer portion uneven distribution property. In the present invention and the present specification, the "rare earth atom surface layer portion uneven distribution property" means that a rare earth atom content with respect to 100 at % of an iron atom in a solution obtained by partially dissolving the hexagonal strontium ferrite powder with an acid (hereinafter, referred to as a "rare earth atom surface layer portion content" or simply a "surface layer portion content" for a rare earth atom.) and a rare earth atom content with respect to 100 at % of an iron atom in a solution obtained by totally dissolving the hexagonal strontium ferrite powder with an acid (hereinafter, referred to as a "rare earth atom bulk content" or simply a "bulk content" for a rare earth atom.) satisfy a ratio of a rare earth atom surface layer portion content/a rare earth atom bulk content>1.0. A rare earth atom content in the hexagonal strontium ferrite powder described below is synonymous with the rare earth atom bulk content. On the other hand, partial dissolution using an acid dissolves a surface layer portion of a particle constituting the hexagonal strontium ferrite powder, and thus, a rare earth atom content in a solution obtained by partial dissolution is a rare earth atom content in a surface layer portion of a particle constituting the hexagonal strontium ferrite powder. A rare earth atom surface layer portion content satisfying a ratio of "rare earth atom surface layer portion content/rare earth atom bulk content>1.0" means that in a particle constituting the hexagonal strontium ferrite powder, rare earth atoms are unevenly distributed in a surface layer portion (that is, more than an inside). The surface layer portion in the present invention and the present specification means a partial region from a surface of a particle constituting the hexagonal strontium ferrite powder toward an inside.

In a case where the hexagonal strontium ferrite powder includes the rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle constituting the hexagonal strontium ferrite powder contribute to suppression of a decrease in reproduction output during repeated reproduction. It is supposed that this is because the hexagonal strontium ferrite powder includes a rare earth atom with a bulk content in the above range, and rare earth atoms are unevenly distributed in a surface layer portion of a particle constituting the hexagonal strontium ferrite powder, and thus it is possible to increase an anisotropy constant Ku. The higher a value of an anisotropy constant Ku is, the more a phenomenon called thermal fluctuation can be suppressed (in other words, thermal stability can be improved). By suppressing occurrence of thermal fluctuation, it is possible to suppress a decrease in reproduction output during repeated reproduction. It is supposed that uneven distribution of rare earth atoms in a particulate surface layer portion of the hexagonal strontium ferrite powder contributes to stabilization of spins of iron (Fe) sites in a crystal lattice of a surface layer portion, and thus, an anisotropy constant Ku may be increased.

Moreover, it is supposed that the use of the hexagonal strontium ferrite powder having a rare earth atom surface layer portion uneven distribution property as a ferromagnetic powder in the magnetic layer also contributes to inhibition of a magnetic layer surface from being scraped by being slid with respect to the magnetic head. That is, it is supposed that the hexagonal strontium ferrite powder having a rare earth atom surface layer portion uneven distribution property can also contribute to an improvement of running durability of the magnetic tape. It is supposed that this may be because uneven distribution of rare earth atoms on a surface of a particle constituting the hexagonal strontium ferrite powder contributes to an improvement of interaction between the particle surface and an organic substance (for example, a binding agent and/or an additive) included in the magnetic layer, and, as a result, a strength of the magnetic layer is improved.

From the viewpoint of suppressing a decrease in reproduction output during repeated reproduction and/or the viewpoint of further improving running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving the hexagonal strontium ferrite powder. In the present invention and the present specification, unless otherwise noted, the content of an atom means a bulk content obtained by totally dissolving the hexagonal strontium ferrite powder. The hexagonal strontium ferrite powder including a rare earth atom may include only one kind of rare earth atom as the rare earth atom, or may include two or more kinds of rare earth atoms. The bulk content in a case of including two or more kinds of rare earth atoms is obtained for the total of two or more kinds of rare earth atoms. This also applies to other components in the present invention and the present specification. That is, unless otherwise noted, a certain component may be used alone or in combination of two or more. A content amount or a content in a case where two or more components are used refers to that for the total of two or more components.

In a case where the hexagonal strontium ferrite powder includes a rare earth atom, the included rare earth atom need only be any one or more of rare earth atoms. As a rare earth atom that is preferable from the viewpoint of suppressing a decrease in reproduction output during repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms need only be unevenly distributed in the surface layer portion of a particle constituting the hexagonal strontium ferrite powder, and the degree of uneven distribution is not limited. For example, for the hexagonal strontium ferrite powder having a rare earth atom surface layer portion uneven distribution property, a ratio of a surface layer portion content of a rare earth atom obtained by partial dissolution under dissolution conditions which will be described below to a bulk content of a rare earth atom obtained by total dissolution under dissolution conditions which will be described below, that is, "surface layer portion content/bulk content" exceeds 1.0 and may be 1.5 or more. The fact that "surface layer portion content/bulk content" is larger than 1.0 means that in a particle constituting the hexagonal strontium ferrite powder, rare earth atoms are unevenly distributed in the surface layer portion (that is, more than an inside). Further, a ratio of a surface layer portion content of a rare earth atom obtained by partial dissolution under dissolution conditions which will be described below to a bulk content of a rare earth atom obtained by total dissolution under the dissolution conditions which will be described below, that is, "surface layer portion content/bulk content" may be, for example, 10.0 or less, 9.0 or less, 8.0 or less, 7.0 or less, 6.0 or less, 5.0 or less, or 4.0 or less. Note that, in the hexagonal strontium ferrite powder having a rare earth atom surface layer portion uneven distribution property, the rare earth atoms need only be unevenly distributed in the surface layer portion of a particle constituting the hexagonal strontium ferrite powder, and the "surface layer portion content/bulk content" is not limited to the exemplified upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic tape, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-91747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle constituting the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Note that the following dissolution conditions such as the amount of sample powder are exemplified, and dissolution conditions for partial dissolution and total dissolution can be employed in any manner.

A container (for example, a beaker) containing 12 mg of the sample powder and 10 mL of 1 mol/L hydrochloric acid is held on a hot plate at a set temperature of 70° C. for 1 hour. The obtained solution is filtered by a membrane filter of 0.1 µm. Elemental analysis of the filtrated solution thus obtained is performed by an inductively coupled plasma (ICP) analyzer. In this way, the surface layer portion content of a rare earth atom with respect to 100 at % of an iron atom can be obtained. In a case where a plurality of kinds of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of the sample powder and 10 mL of 4 mol/L hydrochloric acid is held on a hot plate at a set temperature of 80° C. for 3 hours. Thereafter, the same procedure as the partial dissolution and the measurement of the surface layer portion content is carried out, and the bulk content with respect to 100 at % of an iron atom can be obtained.

From the viewpoint of increasing the reproduction output in a case of reproducing data recorded on the magnetic tape, it is desirable that mass magnetization $\sigma s$ of the ferromagnetic powder included in the magnetic tape is high. In this regard, the hexagonal strontium ferrite powder including a rare earth atom but not having the rare earth atom surface layer portion uneven distribution property tends to have a larger decrease in $\sigma s$ than that of the hexagonal strontium ferrite powder including no rare earth atom. With respect to this, it is considered that the hexagonal strontium ferrite powder having a rare earth atom surface layer portion uneven distribution property is preferable in suppressing such a large decrease in σs. In one aspect, σs of the hexagonal strontium ferrite powder may be 45 A·m²/kg or more, and may be 47 A·m²/kg or more. On the other hand, from the viewpoint of noise reduction, σs is preferably 80 A·m²/kg or less and more preferably 60 A m²/kg or less. σs can be measured using a well-known measuring device, such as a vibrating sample magnetometer, capable of measuring magnetic properties. In the present invention and the present specification, unless otherwise noted, the mass magnetization σs is a value measured at a magnetic field intensity of 15 kOe. 1 [kOe] is $10^6/4\pi$[A/m].

Regarding the content (bulk content) of a constituent atom of the hexagonal strontium ferrite powder, a strontium atom content may be, for example, in a range of 2.0 to 15.0 at % with respect to 100 at % of an iron atom. In one aspect, the hexagonal strontium ferrite powder may include only a strontium atom as a divalent metal atom. In another aspect, the hexagonal strontium ferrite powder may include one or more other divalent metal atoms in addition to a strontium atom. For example, a barium atom and/or a calcium atom may be included. In a case where the other divalent metal atoms other than the strontium atom are included, a content of the barium atom and a content of the calcium atom in the hexagonal strontium ferrite powder respectively can be, for example, in a range of 0.05 to 5.0 at % with respect to 100 at % of the iron atom.

As the hexagonal ferrite crystal structure, a magnetoplumbite type (also referred to as an "M type"), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to one aspect, in the hexagonal strontium ferrite powder, only the M-type crystal structure may be detected by X-ray diffraction analysis. For example, M type hexagonal ferrite is represented by a composition formula of $AFe_{12}O_{19}$. Here, A represents a divalent metal atom, and in a case where the hexagonal strontium ferrite powder is the M type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom may be, for example, 0.5 to 10.0 at % with respect to 100 at % of an iron atom. From the viewpoint of suppressing a decrease in reproduction output during repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in one aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving the hexagonal strontium ferrite powder into a value expressed in at % using an atomic weight of each atom. Further, in the present invention and the present specification, the term "not include" for a certain atom means that a content measured by an ICP analyzer after total dissolution is 0 mass %. A detection limit of the ICP analyzer is usually 0.01 parts per million (ppm) or less on a mass basis. The term "not included" is used as a meaning including that an atom is included in an amount less than the detection limit of the ICP analyzer. In one aspect, the hexagonal strontium ferrite powder may not include a bismuth atom (Bi).

Metal Powder

Preferred specific examples of the ferromagnetic powder include a ferromagnetic metal powder. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

Preferred specific examples of the ferromagnetic powder include an ε-iron oxide powder. In the present invention and the present specification, the term "ε-iron oxide powder" refers to a ferromagnetic powder in which an s-iron oxide crystal structure is detected as a main phase by X-ray diffraction analysis. For example, in a case where the highest intensity diffraction peak is attributed to an ε-iron oxide crystal structure in an X-ray diffraction spectrum obtained by X-ray diffraction analysis, it is determined that the s-iron oxide crystal structure is detected as the main phase. As a method of manufacturing an ε-iron oxide powder, a manufacturing method from a goethite, a reverse micelle method, and the like are known. All of the manufacturing methods are well known. Regarding a method of manufacturing an ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280 to S284, J. Mater. Chem. C, 2013, 1, pp. 5200 to 5206 can be referred to, for example. Note that the method of manufacturing the s-iron oxide powder capable of being used as the ferromagnetic powder in the magnetic layer of the magnetic tape is not limited to the methods described here.

An activation volume of the ε-iron oxide powder is preferably in a range of 300 to 1500 nm³. The finely granulated s-iron oxide powder having an activation volume in the above range is suitable for manufacturing a magnetic tape exhibiting excellent electromagnetic conversion characteristics. The activation volume of the ε-iron oxide powder is preferably 300 nm³ or more, and may be, for example, 500 nm³ or more. Further, from the viewpoint of further improving the electromagnetic conversion characteristics, the activation volume of the ε-iron oxide powder is more preferably 1400 nm³ or less, still more preferably 1300 nm³ or less, still more preferably 1200 nm³ or less, and still more preferably 1100 nm³ or less.

An index for reducing thermal fluctuation, in other words, for improving the thermal stability may include the anisotropy constant Ku. The s-iron oxide powder preferably has Ku of $3.0 \times 10^4$ J/m³ or more, and more preferably has Ku of $8.0 \times 10^4$ J/m³ or more. Ku of the ε-iron oxide powder may be, for example, $3.0 \times 10^5$ J/m³ or less. Here, since higher Ku means higher thermal stability, which is preferable, a value thereof is not limited to the values exemplified above.

From the viewpoint of increasing the reproduction output in a case of reproducing data recorded on the magnetic tape, it is desirable that mass magnetization σs of the ferromagnetic powder included in the magnetic tape is high. In this regard, in one aspect, σs of the ε-iron oxide powder may be 8 A·m$^2$/kg or more, and may be 12 A·m$^2$/kg or more. On the other hand, from the viewpoint of noise reduction, σs of the s-iron oxide powder is preferably 40 A·m$^2$/kg or less and more preferably 35 A·m$^2$/kg or less.

In the present invention and the present specification, unless otherwise noted, an average particle size of various powders such as ferromagnetic powders is a value measured by the following method using a transmission electron microscope.

The powder is imaged at an imaging magnification of 100000× with a transmission electron microscope, the image is printed on photographic printing paper or displayed on a display so that the total magnification of 500000× to obtain an image of particles configuring the powder. A target particle is selected from the obtained image of particles, an outline of the particle is traced by a digitizer, and a size of the particle (primary particle) is measured. The primary particles are independent particles without aggregation.

The measurement described above is performed regarding 500 particles randomly extracted. An arithmetic average of the particle sizes of 500 particles thus obtained is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in Examples which will be described below is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and the present specification, the powder means an aggregate of a plurality of particles. For example, the ferromagnetic powder means an aggregate of a plurality of ferromagnetic particles. Further, the aggregate of the plurality of particles not only includes an aspect in which particles constituting the aggregate directly come into contact with each other, but also includes an aspect in which a binding agent or an additive which will be described below is interposed between the particles. The term "particle" is used to describe a powder in some cases.

As a method of taking a sample powder from the magnetic tape in order to measure the particle size, a method disclosed in a paragraph 0015 of JP2011-048878A can be employed, for example.

In the present invention and the present specification, unless otherwise noted, (1) in a case where the shape of the particle observed in the particle image described above is a needle shape, a fusiform shape, or a columnar shape (here, a height is greater than a maximum major diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum major diameter of a plate surface or a bottom surface), the particle size is shown as a maximum major diameter of the plate surface or the bottom surface, and (3) in a case where the shape of the particle is a sphere shape, a polyhedron shape, or an amorphous shape, and the long axis configuring the particles cannot be specified from the shape, the particle size is shown as an equivalent circle diameter. The equivalent circle diameter refers to a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably in a range of 50 to 90 mass % and more preferably in a range of 60 to 90 mass %, with respect to the total mass of the magnetic layer. A high filling percentage of the ferromagnetic powder in the magnetic layer is preferable from the viewpoint of improving the recording density.

(Binding Agent)

The magnetic tape can be a coating type magnetic tape, and include a binding agent in the magnetic layer. The binding agent is one or more resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described below. For the above binding agent, descriptions disclosed in paragraphs 0028 to 0031 of JP2010-24113A can be referred to. In addition, the binding agent may be a radiation curable resin such as an electron beam curable resin. For the radiation curable resin, descriptions disclosed in paragraphs 0044 and 0045 of JP2011-048878A can be referred to.

An average molecular weight of the resin used as the binding agent can be, for example, 10,000 to 200,000 as a weight-average molecular weight. The binding agent may be used in an amount of, for example, 1.0 to 30.0 parts by mass with respect to 100.0 parts by mass of the ferromagnetic powder.

(Curing Agent)

A curing agent can also be used together with the binding agent. As the curing agent, in one aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. The curing reaction proceeds in the manufacturing step of the magnetic tape, whereby at least a part of the curing agent can be included in the magnetic layer in a state of being reacted (crosslinked) with other components such as the binding agent. The preferred curing agent is a thermosetting compound, and polyisocyanate is suitable for this. For details of the polyisocyanate, descriptions disclosed in paragraphs 0124 and 0125 of JP2011-216149A can be referred to. The curing agent can be used in the composition for forming a magnetic layer in an amount of, for example, 0 to 80.0 parts by mass, and preferably 50.0 to 80.0 parts by mass from the viewpoint of improving a strength of each layer such as the magnetic layer, with respect to 100.0 parts by mass of the binding agent.

(Additive)

The magnetic layer may include one or more kinds of additives, as necessary. As the additives, the curing agent described above is used as an example. In addition, examples of the additive which can be included in the magnetic layer include a non-magnetic powder, a lubricant, a dispersing agent, a dispersing assistant, a fungicide, an antistatic agent, and an antioxidant.

Examples of the dispersing agent that can be added to the composition for forming a magnetic layer include a well-known dispersing agent for improving the dispersibility of the ferromagnetic powder such as a carboxy group-containing compound and a nitrogen-containing compound. For example, the nitrogen-containing compound may be any of a primary amine represented by $NH_2R$, a secondary amine represented by $NHR_2$, and a tertiary amine represented by $NR_3$. In the above, R represents any structure constituting the nitrogen-containing compound, and a plurality of R's may be the same as or different from each other. The nitrogen-containing compound may be a compound (polymer) having a plurality of repeating structures in the molecule. It is considered that a nitrogen-containing portion of the nitrogen-containing compound functions as an adsorbing portion on the particle surface of the ferromagnetic powder, which is the reason why the nitrogen-containing compound can function as a dispersing agent. Examples of the carboxy group-containing compound include a fatty acid such as oleic acid. It is considered that a carboxy group of the carboxy group-containing compound functions as an adsorbing portion on the particle surface of the ferromagnetic powder, which is the reason why the carboxy group-containing compound can function as a dispersing agent. It is also preferable to use the carboxy group-containing compound and the nitrogen-containing compound in combination. The amount of these dispersing agents used can be set appropriately.

The dispersing agent may be added to a composition for forming a non-magnetic layer. For the dispersing agent that can be added to the composition for forming a non-magnetic layer, a description disclosed in a paragraph 0061 of JP2012-133837A can be referred to.

Examples of the additive that can be added to the magnetic layer include a polyalkyleneimine polymer disclosed in JP2016-51493A. For such a polyalkyleneimine polymer, descriptions disclosed in paragraphs 0035 to 0077 of JP2016-51493A and Examples of the same publication can be referred to.

Examples of the non-magnetic powder that can be included in the magnetic layer include a non-magnetic powder which can function as an abrasive and a non-magnetic powder which can function as a protrusion forming agent which forms protrusions suitably protruded from the magnetic layer surface.

As the abrasive, a non-magnetic powder having a Mohs hardness of more than 8 is preferable, and a non-magnetic powder having a Mohs hardness of 9 or more is more preferable. The maximum value of a Mohs hardness is 10. The abrasive can be a powder of an inorganic substance and can also be a powder of an organic substance. The abrasive can be an inorganic or organic oxide powder or a carbide powder. Examples of the carbide include boron carbide (for example, $B_4C$) and titanium carbide (for example, TiC). Diamond can also be used as the abrasive. In one aspect, the abrasive is preferably an inorganic oxide powder. Specifically, examples of the inorganic oxide include alumina (for example, $Al_2O_3$), titanium oxide (for example, $TiO_2$), cerium oxide (for example, $CeO_2$), and zirconium oxide (for example, $ZrO_2$), among these, alumina is preferable. A Mohs hardness of alumina is about 9. For the alumina powder, a description disclosed in a paragraph 0021 of JP2013-229090A can be referred to. A specific surface area can be used as an index of the particle size of the abrasive. It can be considered that the larger the specific surface area, the smaller the particle size of the primary particles of particles constituting the abrasive. As the abrasive, it is preferable to use an abrasive having a specific surface area (hereinafter, referred to as a "BET specific surface area") measured by a Brunauer-Emmett-Teller (BET) method of 14 $m^2/g$ or more. Further, from the viewpoint of the dispersibility, it is preferable to use an abrasive having a BET specific surface area of 40 $m^2/g$ or less. A content of the abrasive in the magnetic layer is preferably 1.0 to 20.0 parts by mass, and more preferably 1.0 to 15.0 parts by mass, with respect to 100.0 parts by mass of the ferromagnetic powder. As the abrasive, only one kind of the non-magnetic powder can be used, and two or more kinds of the non-magnetic powders having different compositions and/or physical properties (for example, size) can also be used. In a case where two or more kinds of the non-magnetic powders are used as the abrasive, the content of the abrasive means the total content of the two or more kinds of non-magnetic powders. The same applies to contents of various components in the present invention and the present specification. The abrasive is preferably subjected to a dispersion treatment separately from the ferromagnetic powder (separate dispersion), and more preferably subjected to a dispersion treatment separately from the protrusion forming agent described below (separate dispersion). In a case where the composition for forming a magnetic layer is prepared, it is preferable to use two or more kinds of dispersion liquids having different components and/or dispersion conditions as a dispersion liquid of the abrasive (hereinafter, referred to as an "abrasive solution") in order to control the abrasion characteristics of the magnetic tape.

A dispersing agent can also be used for adjusting the dispersion state of the dispersion liquid of the abrasive. Examples of a compound that can function as a dispersing agent for improving the dispersibility of the abrasive include an aromatic hydrocarbon compound having a phenolic hydroxy group. The term "phenolic hydroxy group" refers to a hydroxy group directly bonded to an aromatic ring. The aromatic ring included in the aromatic hydrocarbon compound may be a monocyclic ring, a polycyclic structure, or a fused ring. From the viewpoint of improving the dispersibility of the abrasive, an aromatic hydrocarbon compound including a benzene ring or a naphthalene ring is preferable. Further, the aromatic hydrocarbon compound may have a substituent other than the phenolic hydroxy group. Examples of the substituent other than the phenolic hydroxy group include a halogen atom, an alkyl group, an alkoxy group, an amino group, an acyl group, a nitro group, a nitroso group, and a hydroxyalkyl group, and a halogen atom, an alkyl group, an alkoxy group, an amino group, and a hydroxyalkyl group are preferable. The number of phenolic hydroxy groups included in one molecule of the aromatic hydrocarbon compound may be one, two, three, or more.

As a preferable aspect of the aromatic hydrocarbon compound having the phenolic hydroxy group, a compound represented by Formula 100 can be exemplified.

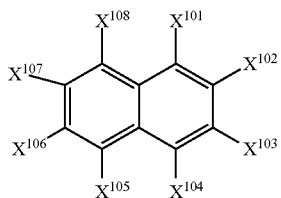

Formula 100

[In Formula 100, two of $X^{101}$ to $X^{108}$ are hydroxy groups, and the other six independently represent a hydrogen atom or a substituent.]

In the compound represented by Formula 100, the substitution positions of two hydroxy groups (phenolic hydroxy groups) are not particularly limited.

In Formula 100, two of $X^{101}$ to $X^{108}$ are hydroxy groups (phenolic hydroxy groups), and the other six independently represent a hydrogen atom or a substituent. Further, in $X^{101}$ to $X^{108}$, moieties other than the two hydroxy groups may all be hydrogen atoms, or some or all of them may be substituents. As a substituent, the substituent described above can be exemplified. As a substituent other than the two hydroxy groups, one or more phenolic hydroxy groups may be included. From the viewpoint of improving the dispersibility of the abrasive, it is preferable that the phenolic hydroxy group is not used except for the two hydroxy groups of $X^{101}$ to $X^{108}$. That is, the compound represented by Formula 100 is preferably dihydroxynaphthalene or a derivative thereof, and more preferably 2,3-dihydroxynaphthalene or a derivative thereof. Examples of preferred substituents represented by $X^{101}$ to $X^{108}$ include a halogen atom (for example, a chlorine atom or a bromine atom), an amino group, an alkyl group having 1 to 6 carbon atoms (preferably 1 to 4), a methoxy group and an ethoxy group, an acyl group, a nitro group and a nitroso group, and —$CH_2OH$ group.

For the dispersing agent for improving the dispersibility of the abrasive, descriptions disclosed in paragraphs 0024 to 0028 of JP2014-179149A can be referred to.

The dispersing agent for improving the dispersibility of the abrasive can be used, for example, in a proportion of 0.5 to 20.0 parts by mass, and is preferably used in a proportion of 1.0 to 10.0 parts by mass to 100.0 parts by mass of the abrasive, for example, in a case where the abrasive solution is prepared (for each abrasive solution in a case where a plurality of the abrasive solutions are prepared).

As one aspect of the protrusion forming agent, carbon black can be used. A BET specific surface area of carbon black is preferably 10 $m^2/g$ or more and more preferably 15 $m^2/g$ or more. The BET specific surface area of carbon black is preferably 50 $m^2/g$ or less, and more preferably 40 $m^2/g$ or less, from the viewpoint of the ease of improving the dispersibility. In addition, as another aspect of the protrusion forming agent, colloidal particles can be exemplified. The colloidal particles are preferably inorganic colloidal particles, more preferably inorganic oxide colloidal particles, and still more preferably silica colloidal particles (colloidal silica), from the viewpoint of availability. In the present invention and the present specification, the "colloidal particles" refer to particles which are dispersed without precipitation to generate a colloidal dispersion, in a case where 1 g of the particles is added to 100 mL of at least one organic solvent of methyl ethyl ketone, cyclohexanone, toluene, or ethyl acetate, or a mixed solvent including two or more kinds of the solvent described above at an optional mixing ratio. An average particle size of the colloidal particles may be, for example, 30 to 300 nm, and preferably 40 to 200 nm. A content of the protrusion forming agent in the magnetic layer is preferably 0.5 to 4.0 parts by mass, and more preferably 0.5 to 3.5 parts by mass, with respect to 100.0 parts by mass of the ferromagnetic powder. The protrusion forming agent is preferably subjected to a dispersion treatment separately from the ferromagnetic powder, and more preferably subjected to a dispersion treatment separately from the abrasive. In a case where the composition for forming a magnetic layer is prepared, two or more kinds of dispersion liquids having different components and/or dispersion conditions can be prepared as a dispersion liquid of the protrusion forming agent (hereinafter, also referred to as a "protrusion forming agent liquid").

As one aspect of the additive which can be included in the magnetic layer, a compound having an ammonium salt structure of an alkyl ester anion represented by Formula 1 can be exemplified.

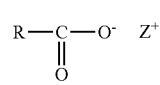

Formula 1

(In Formula 1, R represents an alkyl group having 7 or more carbon atoms or a fluorinated alkyl group having 7 or more carbon atoms, and $Z^+$ represents an ammonium cation.)

The present inventor considers that the above compound can function as a lubricant. This point will be further described below.

The lubricant can be broadly divided into a fluid lubricant and a boundary lubricant. The present inventor considers that the compound having the ammonium salt structure of the alkyl ester anion represented by Formula 1 can function as a fluid lubricant. It is considered that the fluid lubricant itself can play a role of imparting lubricity to the magnetic layer by forming a liquid film on the magnetic layer surface. It is supposed that it is desirable that the fluid lubricant forms a liquid film on the magnetic layer surface, in order to control the AlFeSil abrasion value$_{45°}$ and the standard deviation of the AlFeSil abrasion value. In addition, in a case where the AlFeSil abrasion value is measured, the measured value may be smaller as the magnetic layer surface and the AlFeSil square bar can be slid on each other more stably. Regarding the liquid film of the fluid lubricant, it is considered desirable to use an appropriate amount of the fluid lubricant forming the liquid film on the magnetic layer surface, from the viewpoint of enabling more stable sliding. This is because it is supposed that in a case where the amount of the liquid lubricant forming the liquid film on the magnetic layer surface is excessive, the magnetic layer surface and the AlFeSil square bar are adhered to each other and sliding stability is likely to be lowered. In addition, it is supposed that in a case where the amount of the liquid lubricant forming the liquid film on the magnetic layer surface is excessive, the protrusion formed on the magnetic layer surface by, for example, a protrusion forming agent is covered with the liquid film. It is considered that this can also be a factor that makes the sliding stability be lowered.

Regarding the above point, the above compound includes the ammonium salt structure of the alkyl ester anion represented by Formula 1. It is considered that a compound including such a structure can play an excellent role as a fluid lubricant even in a relatively small amount. Therefore, it is considered that the inclusion of the above compound in the magnetic layer leads to improvement of the sliding stability between the magnetic layer surface of the magnetic tape and the AlFeSil square bar and can contribute to controlling of the AlFeSil abrasion value$_{45°}$ and the standard deviation of the AlFeSil abrasion value.

Hereinafter, the above compound will be described in more detail.

In the present invention and the present specification, unless otherwise noted, groups described below may have a substituent or may be unsubstituted. In addition, for a group having a substituent, the term "carbon atoms" means the number of carbon atoms not including the number of carbon atoms of the substituent, unless otherwise noted. In the present invention and the present specification, examples of the substituent include an alkyl group (for example, an alkyl group having 1 to 6 carbon atoms), a hydroxy group, an alkoxy group (for example, an alkoxy group having 1 to 6 carbon atoms), a halogen atom (for example, a fluorine atom, a chlorine atom, a bromine atom, or the like), a cyano group, an amino group, a nitro group, an acyl group, a carboxy group, a salt of a carboxy group, a sulfonic acid group, and a salt of a sulfonic acid group.

In the compound having the ammonium salt structure of the alkyl ester anion represented by Formula 1, at least a part included in the magnetic layer can form a liquid film on the magnetic layer surface, and a part included in the magnetic layer can move to the magnetic layer surface during sliding with the magnetic head to form a liquid film. In addition, a part of the compound can be included in the non-magnetic layer described below, and can move to the magnetic layer and further move to the magnetic layer surface to form a liquid film. The "alkyl ester anion" can also be called an "alkyl carboxylate anion".

In Formula 1, R represents an alkyl group having 7 or more carbon atoms or a fluorinated alkyl group having 7 or more carbon atoms. The fluorinated alkyl group has a structure in which some or all of the hydrogen atoms constituting the alkyl group are substituted with fluorine atoms. The alkyl group or the fluorinated alkyl group represented by R may have a linear structure or a branched structure, may be a cyclic alkyl group or a fluorinated alkyl group, and is preferably a linear structure. The alkyl group or the fluorinated alkyl group represented by R may have a substituent, may be unsubstituted, and is preferably unsubstituted. The alkyl group represented by R can be represented by, for example, $C_nH_{2n+1}$—. Here, n represents an integer of 7 or more. In addition, the fluorinated alkyl group represented by R may have a structure in which some or all of the hydrogen atoms constituting the alkyl group represented by, for example, $C_nH_{2n+1}$— are substituted with fluorine atoms. The carbon number of the alkyl group or the fluorinated alkyl group represented by R is 7 or more, preferably 8 or more, more preferably 9 or more, still more preferably 10 or more, still more preferably 11 or more, still more preferably 12 or more, and still more preferably 13 or more. In addition, the carbon number of the alkyl group or the fluorinated alkyl group represented by R is preferably 20 or less, more preferably 19 or less, and still more preferably 18 or less.

In Formula 1, Z represents an ammonium cation. Specifically, the ammonium cation has the following structure. In the present invention and the present specification, "*" in the formula representing a part of a compound represents a bonding position between a structure of the part and an adjacent atom.

A nitrogen cation $N^+$ of the ammonium cation and an oxygen anion $O^-$ in Formula 1 may form a salt crosslinking group to form the ammonium salt structure of the alkyl ester anion represented by Formula 1. The inclusion of the compound having the ammonium salt structure of the alkyl ester anion represented by Formula 1 in the magnetic layer can be confirmed by analyzing the magnetic tape by X-ray photoelectron spectroscopy (electron spectroscopy for chemical analysis (ESCA)), infrared spectroscopy (IR), or the like.

In one aspect, the ammonium cation represented by $Z^+$ may be provided, for example, by a nitrogen atom of a nitrogen-containing polymer being a cation. The nitrogen-containing polymer means a polymer including a nitrogen atom. In the present invention and the present specification, the term "polymer" is used to encompass a homopolymer and a copolymer. The nitrogen atom may be included as an atom constituting a main chain of the polymer in one aspect, and may be included as an atom constituting a side chain of the polymer in one aspect.

As one aspect of the nitrogen-containing polymer, polyalkyleneimine can be exemplified. Polyalkyleneimine is a ring-opening polymer of alkyleneimine and is a polymer having a plurality of repeating units represented by Formula 2.

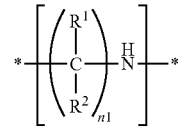

Formula 2

The ammonium cation represented by $Z^+$ in Formula 1 may be provided by a nitrogen atom N constituting a main chain in Formula 2 being a nitrogen cation $N^+$. Then, the ammonium salt structure can be formed with the alkyl ester anion, for example, as follows.

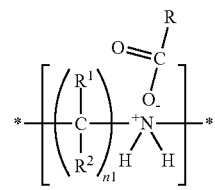

Hereinafter, Formula 2 will be described in more detail.

In Formula 2, $R^1$ and $R^2$ each independently represent a hydrogen atom or an alkyl group, and n1 represents an integer of 2 or more.

Examples of the alkyl group represented by $R^1$ or $R^2$ include an alkyl group having 1 to 6 carbon atoms, preferably an alkyl group having 1 to 3 carbon atoms, more preferably a methyl group or an ethyl group, and still more preferably a methyl group. The alkyl group represented by $R^1$ or $R^2$ is preferably an unsubstituted alkyl group. The combination of $R^1$ and $R^2$ in Formula 2 may be a form in which one is a hydrogen atom and the other is an alkyl group, a form in which both are hydrogen atoms, and a form in which both are alkyl groups (the same or different alkyl groups), and the form in which both are hydrogen atoms is preferable. As the alkyleneimine that provides the polyalkyleneimine, a structure having the lowest number of carbon atoms constituting a ring is ethyleneimine, and the number of carbon atoms in a main chain of the alkyleneimine (ethyleneimine) obtained by the ring opening of the ethyleneimine is 2. Therefore, n1 in Formula 2 is 2 or more. n1 in Formula 2 may be, for example, 10 or less, 8 or less, 6 or less, or 4 or less. The polyalkyleneimine may be a homopolymer including only the same structure as the repeating structure represented by Formula 2, or may be a copolymer including two or more different structures as the repeating structure represented by Formula 2. A number-average molecular weight of polyalkyleneimine that can be used to form the compound having the ammonium salt structure of the alkyl ester anion represented by Formula 1 may be, for example, 200 or more, preferably 300 or more, and more preferably 400 or more. The number-average molecular weight of the polyalkyleneimine may be, for example, 10,000 or less, preferably 5,000 or less, and more preferably 2,000 or less.

In the present invention and the present specification, the average molecular weight (weight-average molecular weight and number-average molecular weight) means a value measured by gel permeation chromatography (GPC) with standard polystyrene conversion. Unless otherwise noted, the average molecular weight shown in Examples described below is a value (polystyrene conversion value) obtained by standard polystyrene conversion of values measured under the following measurement conditions using GPC.

GPC device: HLC-8220 (manufactured by Tosoh Corporation)

Guard column: TSKguardcolumn Super HZM-H

Column: TSKgel Super HZ 2000, TSKgel Super HZ 4000, TSKgel Super HZ-M (manufactured by Tosoh Corporation, 4.6 mm (inner diameter)×15.0 cm, three columns connected in series)

Eluent: Tetrahydrofuran (THF), containing stabilizer (2,6-di-t-butyl-4-methylphenol)

Flow rate of eluent: 0.35 mL/min

Column temperature: 40° C.

Inlet temperature: 40° C.

Refractive index (RI) measurement temperature: 40° C.

Sample concentration: 0.3 mass %

Sample injection amount: 10 μL

As another aspect of the nitrogen-containing polymer, polyallylamine can be exemplified. Polyallylamine is a polymer of allylamine and is a polymer having a plurality of repeating units represented by Formula 3.

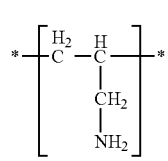

Formula 3

The ammonium cation represented by $Z^+$ in Formula 1 may be provided by a nitrogen atom N constituting an amino group of a side chain in Formula 3 being a nitrogen cation $N^+$. Then, the ammonium salt structure can be formed with the alkyl ester anion, for example, as follows.

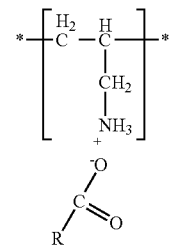

A weight-average molecular weight of polyallylamine that can be used to form the compound having the ammonium salt structure of the alkyl ester anion represented by Formula 1 may be, for example, 200 or more, preferably 1,000 or more, and more preferably 1,500 or more. The weight-average molecular weight of the polyallylamine may be, for example, 15,000 or less, preferably 10,000 or less, and more preferably 8,000 or less.

The inclusion of a compound having a structure derived from polyalkyleneimine or polyallylamine as the compound having the ammonium salt structure of the alkyl ester anion represented by Formula 1 can be confirmed by analyzing the magnetic layer surface by time-of-flight secondary ion mass spectrometry (TOF-SIMS) or the like.

The compound having the ammonium salt structure of the alkyl ester anion represented by Formula 1 may be a salt of the nitrogen-containing polymer and one or more kinds of fatty acids selected from the group consisting of fatty acids having 7 or more carbon atoms and fluorinated fatty acids having 7 or more carbon atoms. The nitrogen-containing polymer forming a salt may be one or more kinds of nitrogen-containing polymers, and may be, for example, a nitrogen-containing polymer selected from the group consisting of polyalkyleneimine and polyallylamine. The fatty acids forming a salt may be one or more kinds of fatty acids selected from the group consisting of fatty acids having 7 or more carbon atoms and fluorinated fatty acids having 7 or more carbon atoms. The fluorinated fatty acid has a structure in which some or all of the hydrogen atoms constituting an alkyl group bonded to a carboxy group COOH in the fatty acid are substituted with fluorine atoms. For example, the salt forming reaction can easily proceed by mixing the nitrogen-containing polymer and the above fatty acids at a room temperature. A room temperature is, for example, about 20° C. to 25° C. In one aspect, one or more kinds of nitrogen-containing polymers and one or more kinds of the fatty acids are used as components of the composition for forming a magnetic layer, and these are mixed in a step of preparing the composition for forming a magnetic layer to allow the salt forming reaction to proceed. In addition, in one aspect, the composition for forming a magnetic layer can be prepared by mixing one or more kinds of nitrogen-containing polymers and one or more kinds of the fatty acids to form a salt before preparation of the composition for forming a magnetic layer, and then using the salt as a component of the composition for forming a magnetic layer. This point also applies to a case of forming a non-magnetic layer including the compound having the ammonium salt structure of the alkyl ester anion represented by Formula 1. For example, for the magnetic layer, 0.1 to 10.0 parts by mass of the nitrogen-containing polymer can be used, and 0.5 to 8.0 parts by mass of the nitrogen-containing polymer is preferably used, per 100.0 parts by mass of the ferromagnetic powder. The above fatty acids can be used, for example, in an amount of 0.05 to 10.0 parts by mass and are preferably used in an amount of 0.1 to 5.0 parts by mass, per 100.0 parts by mass of the ferromagnetic powder. In addition, for the non-magnetic layer, 0.1 to 10.0 parts by mass of the nitrogen-containing polymer can be used, and 0.5 to 8.0 parts by mass of the nitrogen-containing polymer is preferably used, per 100.0 parts by mass of the non-magnetic powder. The above fatty acids can be used, for example, in an amount of 0.05 to 10.0 parts by mass and are preferably used in an amount of 0.1 to 5.0 parts by mass, per 100.0 parts by mass of the non-magnetic powder. In a case where the nitrogen-containing polymer and the fatty acids are mixed to form an ammonium salt of the alkyl ester anion represented by Formula 1, in addition, a nitrogen atom constituting the nitrogen-containing polymer may react with a carboxy group of the fatty acids to form the following structure, and a form including such a structure is also included in the compound.

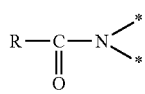

Examples of the fatty acids include fatty acids having an alkyl group described above as R in Formula 1 and fluorinated fatty acids having a fluorinated alkyl group described above as R in Formula 1.

A mixing ratio of the nitrogen-containing polymer used to form the compound having the ammonium salt structure of the alkyl ester anion represented by Formula 1 to the fatty acid is preferably 10:90 to 90:10, more preferably 20:80 to 85:15, and still more preferably 30:70 to 80:20 as a mass ratio of the nitrogen-containing polymer:the fatty acids. In addition, the compound having the ammonium salt structure of the alkyl ester anion represented by Formula 1 is preferably included in the magnetic layer in an amount of 0.01 parts by mass or more, more preferably 0.1 parts by mass or more, and still more preferably 0.5 parts by mass or more with respect to 100.0 parts by mass of the ferromagnetic powder. Here, the content of the compound in the magnetic layer means the total amount of the amount of the liquid film formed on the magnetic layer surface and the amount included inside the magnetic layer. On the other hand, a high content of the ferromagnetic powder in the magnetic layer is preferable from the viewpoint of high-density recording. Therefore, from the viewpoint of high-density recording, it is preferable that the content of components other than the ferromagnetic powder is small. From this viewpoint, the content of the compound in the magnetic layer is preferably 15.0 parts by mass or less, more preferably 10.0 parts by mass or less, and still more preferably 8.0 parts by mass or less with respect to 100.0 parts by mass of the ferromagnetic powder. In addition, the preferred range of the content of the compound in the composition for forming a magnetic layer used for forming the magnetic layer is also the same.

As the lubricant, for example, a fatty acid amide that can function as a boundary lubricant can be used. It is considered that the boundary lubricant is a lubricant that can reduce contact friction by adsorbing on a surface of a powder (for example, a ferromagnetic powder) and forming a rigid lubricating film. Examples of the fatty acid amide include amides of various fatty acids such as lauric acid, myristic acid, palmitic acid, stearic acid, oleic acid, linoleic acid, linolenic acid, behenic acid, erucic acid, and elaidic acid, and specifically, lauric acid amide, myristic acid amide, palmitic acid amide, and stearic acid amide. The content amount of the fatty acid amide in the magnetic layer is, for example, 0 to 3.0 parts by mass, preferably 0 to 2.0 parts by mass, and more preferably 0 to 1.0 part by mass per 100.0 parts by mass of the ferromagnetic powder. In addition, the fatty acid amide may also be included in the non-magnetic layer. The content of the fatty acid amide in the non-magnetic layer is, for example, 0 to 3.0 parts by mass, and preferably 0 to 1.0 part by mass per 100.0 parts by mass of the non-magnetic powder. For the dispersing agent, descriptions disclosed in paragraphs 0061 and 0071 of JP2012-133837A can be referred to. The dispersing agent may be added to a composition for forming a non-magnetic layer. For the dispersing agent that can be added to the composition for forming a non-magnetic layer, a description disclosed in a paragraph 0061 of JP2012-133837A can be referred to.

The present inventor considers as follows regarding the suppression of the deterioration in electromagnetic conversion characteristics in a case of recording data on the magnetic tape and/or reproducing the recorded data at different head tilt angles.

It is supposed that in a case where the head tilt angle is different, a degree of abrasion of the magnetic tape head caused by the contact with the magnetic tape head greatly differs during recording and/or reproduction (large variation in the degree of abrasion). It is considered that the large variation in the degree of abrasion is a factor of the deterioration of the electromagnetic conversion characteristics.

By the way, it is considered that the size and content of the abrasive, the shear stress on the magnetic head (which may affect the friction characteristics), the normal force, and the like affect the abrasion. It is considered that in a case where the value of the head tilt angle increases, the normal force tends to increase, and therefore the abrasive penetrates into the magnetic head deeply, resulting in increased friction and increased abrasion. With respect to this, it is considered that the use of the above compound, which is considered to function as a liquid lubricant, for example, as a component of the magnetic layer, leads to enhancement of the lubricity (slidability) of the magnetic layer surface, and can contribute to suppression of the large variation in the degree of abrasion of the magnetic head due to the difference in head tilt angle. In addition, for the abrasive, it is supposed that the larger the amount of the abrasive included in the magnetic layer, the more likely the abrasion of the magnetic head occurs in a case where the head tilt angle is large. It is supposed that in a case where the head tilt angle is small, larger sized abrasives in a plurality of abrasives of different sizes used as components of the magnetic layer are more likely to cause abrasion of the magnetic head.

Regarding the above point, the present inventor considers that, for example, the use of the above compound as a component used as a lubricant for forming the magnetic layer, the combination of the abrasives used, and/or the adjustment of the content of the abrasive can contribute to controlling of the values of the AlFeSil abrasion value$_{45°}$ and the standard deviation of the AlFeSil abrasion value. It is supposed that controlling the values of the AlFeSil abrasion value$_{45°}$ and the standard deviation of the AlFeSil abrasion value in the ranges described above leads to the suppression of the deterioration in electromagnetic conversion characteristics in a case of recording data on the magnetic tape and/or reproducing the recorded data at different head tilt angles.

Non-Magnetic Layer

Next, the non-magnetic layer will be described. The above magnetic tape may have a magnetic layer directly on the non-magnetic support, or may have a non-magnetic layer including a non-magnetic powder between the non-magnetic support and the magnetic layer. The non-magnetic powder used for the non-magnetic layer may be an inorganic substance powder (inorganic powder) or an organic substance powder (organic powder). In addition, the carbon black and the like can be used. Examples of the inorganic substance include metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably in a range of 50 to 90 mass % and more preferably in a range of 60 to 90 mass %, with respect to the total mass of the non-magnetic layer.

The non-magnetic layer can include a binding agent, and can also include an additive. For other details of the binding agent or the additive of the non-magnetic layer, a well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having a coercivity equal to or smaller than 7.96 kA/m (100 Oe), or a layer having a residual magnetic flux density equal to or smaller than 10 mT and a coercivity equal to or smaller than 7.96 kA/m (100 Oe). It is preferable that the non-magnetic layer does not have a residual magnetic flux density and coercivity.

<Non-Magnetic Support>

Next, the non-magnetic support will be described. Examples of the non-magnetic support (hereinafter, also simply referred to as a "support") include well-known components such as polyethylene terephthalate, polyethylene naphthalate, polyamide, polyamideimide, and aromatic polyamide subjected to biaxial stretching. Among these, polyethylene terephthalate, polyethylene naphthalate, and polyamide are preferable. A corona discharge, a plasma treatment, an easy-bonding treatment, or a heat treatment may be performed on these supports in advance.

<Back Coating Layer>

The tape may or may not have a back coating layer including a non-magnetic powder on a surface side of the non-magnetic support opposite to a surface side having the magnetic layer. The back coating layer preferably contains one or both of carbon black and an inorganic powder. The back coating layer can include a binding agent, and can also include an additive. For details of the non-magnetic powder, the binding agent, and the additive of the back coating layer, a well-known technology regarding the back coating layer can be applied, and a well-known technology regarding the magnetic layer and/or the non-magnetic layer can be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

<Various Thicknesses>

Regarding a thickness (total thickness) of the magnetic tape, it has been required to increase the recording capacity (increase the capacity) of the magnetic tape with the enormous increase in the amount of information in recent years. For example, as means for increasing the capacity, a thickness of the magnetic tape may be reduced to increase a length of the magnetic tape accommodated in one roll of a magnetic tape cartridge. From this point, the thickness (total thickness) of the magnetic tape is preferably 5.6 µm or less, more preferably 5.5 µm or less, still more preferably 5.4 µm or less, still more preferably 5.3 µm or less, and still more preferably 5.2 µm or less. In addition, from the viewpoint of ease of handling, the thickness of the magnetic tape is preferably 3.0 µm or more, and more preferably 3.5 µm or more.

The thickness (total thickness) of the magnetic tape can be measured by the following method.

Ten tape samples (for example, 5 to 10 cm in length) are cut out from any part of the magnetic tape, and these tape samples are stacked to measure the thickness. A value (thickness per tape sample) obtained by dividing the measured thickness by 1/10 is defined as the tape thickness. The thickness measurement can be performed using a well-known measuring instrument capable of measuring a thickness on the order of 0.1 µm.

A thickness of the non-magnetic support is preferably 3.0 to 5.0 µm.

A thickness of the magnetic layer can be optimized according to a saturation magnetization amount of a magnetic head used, a head gap length, a band of a recording signal, and the like, and is generally 0.01 µm to 0.15 µm, and, from the viewpoint of high-density recording, the thickness is preferably 0.02 µm to 0.12 µm and more preferably 0.03 µm to 0.1 µm. The magnetic layer need only be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 0.1 to 1.5 µm, and preferably 0.1 to 1.0 µm.

A thickness of the back coating layer is preferably 0.9 µm or less and more preferably 0.1 to 0.7 µm.

Various thicknesses such as the thickness of the magnetic layer and the like can be obtained by the following method.

A cross section of the magnetic tape in a thickness direction is exposed by an ion beam, and then the exposed cross section observation is performed using a scanning electron microscope or a transmission electron microscope. Various thicknesses can be obtained as an arithmetic average of thicknesses obtained at two optional points in the cross section observation. Alternatively, the various thicknesses can be obtained as a designed thickness calculated according to manufacturing conditions.

<Manufacturing Method>
(Preparation of Composition for Forming Each Layer)

A composition for forming the magnetic layer, the non-magnetic layer, or the back coating layer usually includes a solvent together with the various components described above. As a solvent, various organic solvents generally used for manufacturing a coating type magnetic recording medium can be used. Among these, from the viewpoint of solubility of the binding agent usually used in the coating type magnetic recording medium, a composition for forming each layer preferably includes one or more ketone solvents such as acetone, methyl ethyl ketone, methyl isobutyl ketone, diisobutyl ketone, cyclohexanone, isophorone, and tetrahydrofuran. The amount of the solvent in the composition for forming each layer is not particularly limited, and can be set to the same as that of the composition for forming each layer of a typical coating type magnetic recording medium. In addition, a step of preparing the composition for forming each layer can usually include at least a kneading step, a dispersing step, and a mixing step provided before and after these steps, as necessary. Each step may be divided into two or more stages. Components used for the preparation of the composition for forming each layer may be added at an initial stage or in a middle stage of each step. In addition, each component may be separately added in two or more steps. For example, a binding agent may be added separately in a kneading step, a dispersing step, and a mixing step for adjusting a viscosity after dispersion. In addition, as described above, one or more kinds of nitrogen-containing polymers and one or more kinds of the fatty acids are used as components of the composition for forming a magnetic layer, and these are mixed in a step of preparing the composition for forming a magnetic layer to allow the salt forming reaction to proceed. In addition, in one aspect, the composition for forming a magnetic layer can be prepared by mixing one or more kinds of nitrogen-containing polymers and one or more kinds of the fatty acids to form a salt before preparation of the composition for forming a magnetic layer, and then using the salt as a component of the composition for forming a magnetic layer. This point also applies to a step of preparing the composition for forming a non-magnetic layer. It is preferable that the abrasive solution is prepared by being separately dispersed from the ferromagnetic powder and the protrusion forming agent. The abrasive solution is preferably prepared as one or more kinds of abrasive solutions including an abrasive, a solvent, and preferably a binding agent, separately from the ferromagnetic powder and the protrusion forming agent, and can be used for preparing a composition for forming a magnetic layer. A dispersion treatment and/or a classification treatment can be performed for the preparation of the abrasive solution. A commercially available device can be used for these treatments.

In the manufacturing step of the magnetic tape, a well-known manufacturing technology in the related art can be used in a part or all of the steps. In the kneading step, an open kneader, a continuous kneader, a pressure kneader, or a kneader having a strong kneading force such as an extruder is preferably used. Details of the kneading treatment are described in JP1989-106338A (JP-H01-106338A) and JP1989-79274A (JP-H01-79274A). In addition, in order to disperse the composition for forming each layer, glass beads and/or other beads can be used. As such dispersion beads, zirconia beads, titania beads, and steel beads which are dispersion beads having a high specific gravity are suitable. These dispersion beads are preferably used by optimizing a particle diameter (bead diameter) and filling percentage. As a dispersing device, a well-known dispersing device can be used. The composition for forming each layer may be filtered by a well-known method before performing the coating step. The filtering can be performed by using a filter, for example. As the filter used in the filtering, a filter having a pore diameter of 0.01 to 3 µm (for example, a filter made of glass fiber or a filter made of polypropylene) can be used, for example.

Regarding the dispersion treatment of the composition for forming a magnetic layer, in one aspect, the dispersion treatment of the ferromagnetic powder is performed by the two-stage dispersion treatment, in which the coarse aggregation of the ferromagnetic powder is crushed by the first-stage dispersion treatment, and then the second-stage dispersion treatment can be performed in which the collision energy applied to the particles of the ferromagnetic powder by the collision with the dispersion beads is smaller than that in the first-stage dispersion treatment. It is considered that such a dispersion treatment makes it possible to improve the dispersibility of the ferromagnetic powder and suppress the occurrence of chipping (partially lacking particles).

An example of the two-stage dispersion treatment includes a dispersion treatment including a first stage of obtaining a dispersion liquid by subjecting a ferromagnetic powder, a binding agent, and a solvent to a dispersion treatment in the presence of first dispersion beads and a second stage of subjecting the dispersion liquid obtained in the first stage to a dispersion treatment in the presence of second dispersion beads having a smaller bead diameter and density than the first dispersion beads. Hereinafter, the above dispersion treatment will be further described.

In order to improve the dispersibility of the ferromagnetic powder, it is preferable that the first stage and the second stage described above are performed as a dispersion treatment before mixing the ferromagnetic powder with other powder components. For example, the first stage and the second stage are preferably performed as a dispersion treatment of a liquid (magnetic liquid) including a ferromagnetic powder, a binding agent, a solvent, and an optionally added additive before mixing the ferromagnetic powder with the abrasive and the protrusion forming agent.

The bead diameter of the second dispersion beads is preferably 1/100 or less of the bead diameter of the first dispersion beads, and more preferably 1/500 or less of the bead diameter of the first dispersion beads. In addition, the bead diameter of the second dispersion beads may be, for example, 1/10000 or more of the bead diameter of the first dispersion beads. However, it is not limited to this range. For example, the bead diameter of the second dispersion beads is preferably in a range of 80 to 1000 nm. On the other hand, the bead diameter of the first dispersion beads may be, for example, in a range of 0.2 to 1.0 mm.

In the present invention and the present specification, the bead diameter is a value measured by the same method as a method for measuring an average particle size of the powder described above.

The second stage is preferably performed under a condition that, on a mass basis, the second dispersion beads are present in an amount of 10 times or more of a ferromagnetic hexagonal ferrite powder, and more preferably performed under a condition that the second dispersion beads are present in an amount of 10 times to 30 times of the ferromagnetic hexagonal ferrite powder.

On the other hand, the amount of the first dispersion beads in the first stage is also preferably in the above range.

The second dispersion beads are beads having a density lower than that of the first dispersion beads. The "density" is obtained by dividing the mass (unit: g) of the dispersion beads by the volume (unit: $cm^3$). The measurement is performed by an Archimedes method. The density of the second dispersion beads is preferably 3.7 $g/cm^3$ or less, and more preferably 3.5 $g/cm^3$ or less. The density of the second dispersion beads may be, for example, 2.0 $g/cm^3$ or more, and may be lower than 2.0 $g/cm^3$. Preferred second dispersion beads in terms of the density include diamond beads, silicon carbide beads, silicon nitride beads and the like, and preferred second dispersion beads in terms of the density and the hardness include diamond beads.

On the other hand, as the first dispersion beads, dispersion beads having a density of more than 3.7 $g/cm^3$ are preferable, dispersion beads having a density of 3.8 $g/cm^3$ or more are more preferable, and dispersion beads having a density of 4.0 $g/cm^3$ or more are still more preferable. The density of the first dispersion beads may be, for example, 7.0 $g/cm^3$ or less, and may be more than 7.0 $g/cm^3$. As the first dispersion beads, zirconia beads, alumina beads, and the like are preferably used, and zirconia beads are more preferably used.

The dispersion time is not particularly limited and need only be set according to the type of the dispersing device used.

(Coating Step)

The magnetic layer can be formed by directly applying the composition for forming a magnetic layer onto the non-magnetic support surface or performing multilayer applying of the composition for forming a magnetic layer with the composition for forming a non-magnetic layer sequentially or simultaneously. The back coating layer can be formed by applying a composition for forming a back coating layer forming onto a surface of the non-magnetic support opposite to a surface having the non-magnetic layer and/or the magnetic layer (or to be provided with the non-magnetic layer and/or the magnetic layer). For details of the coating for forming each layer, a description disclosed in a paragraph 0066 of JP2010-231843A can be referred to.

(Other Steps)

Well-known technologies can be applied to other various steps for manufacturing the magnetic tape. Regarding the various steps, the descriptions disclosed in paragraphs 0067 to 0070 of JP2010-231843A can be referred to, for example. For example, a coating layer of the composition for forming a magnetic layer can be subjected to an alignment treatment in an alignment zone while the coating layer is in a wet state. For the alignment treatment, the various well-known technologies including a description disclosed in a paragraph 0052 of JP2010-24113A can be used. For example, a vertical alignment treatment can be performed by a well-known method such as a method using a polar opposing magnet. In the alignment zone, a drying speed of the coating layer can be controlled depending on a temperature of dry air and an air volume and/or a transportation speed in the alignment zone. Further, the coating layer may be preliminarily dried before the transportation to the alignment zone. As an example, a magnetic field intensity in the vertical alignment treatment may be 0.1 to 1.5 T.

Through various steps, a long magnetic tape original roll can be obtained. The obtained magnetic tape original roll is cut (slit) by a well-known cutter, for example, to have a width of the magnetic tape to be accommodated in the magnetic tape cartridge. The width can be determined according to the standard, and is usually ½ inches. 1 inch=2.54 cm.

A servo pattern is usually formed on the magnetic tape obtained by slitting.

(Heat Treatment)

In one aspect, the magnetic tape can be a magnetic tape manufactured through the following heat treatment. In another aspect, the magnetic tape can be manufactured without the following heat treatment.

The heat treatment can be performed in a state where the magnetic tape that has been slit and cut to have a width determined according to a standard is wound around a core member.

In one aspect, the heat treatment is performed in a state where the magnetic tape is wound around a core member for the heat treatment (hereinafter, referred to as a "winding core for heat treatment"), the magnetic tape after the heat treatment is wound around a cartridge reel of the magnetic tape cartridge, and the magnetic tape cartridge in which the magnetic tape is wound around the cartridge reel can be manufactured.

The winding core for heat treatment can be formed of metal, a resin, or paper. The material of the winding core for heat treatment is preferably a material having high stiffness, from the viewpoint of suppressing the occurrence of winding failure such as spoking. From this point, the winding core for heat treatment is preferably formed of metal or a resin. In addition, as an index for stiffness, a bending elastic modulus of the material of the winding core for heat treatment is preferably 0.2 GPa (Gigapascal) or more, and more preferably 0.3 GPa or more. Meanwhile, since the material having high stiffness is generally expensive, the use of the winding core for heat treatment of the material having stiffness exceeding the stiffness capable of suppressing the occurrence of the winding failure leads to an increase in cost. Considering the above point, the bending elastic modulus of the material of the winding core for heat treatment is preferably 250 GPa or less. The bending elastic modulus is a value measured in accordance with international organization for standardization (ISO) 178, and the bending elastic modulus of various materials is well-known. In addition, the winding core for heat treatment can be a solid or hollow core member. In a case of the hollow core member, a thickness thereof is preferably 2 mm or more from the viewpoint of maintaining stiffness. In addition, the winding core for heat treatment may include or may not include a flange.

It is preferable to prepare a magnetic tape having a length equal to or more than a length to be finally accommodated in the magnetic tape cartridge (hereinafter, referred to as a "final product length") as the magnetic tape wound around the winding core for heat treatment, and to perform the heat treatment by placing the magnetic tape in a heat treatment environment while being wound around the winding core for heat treatment. The length of the magnetic tape wound around the winding core for heat treatment is equal to or more than the final product length, and is preferably the "final product length+α", from the viewpoint of ease of winding around the winding core for heat treatment. This a is preferably 5 m or more, from the viewpoint of ease of the winding. The tension during winding around the winding core for heat treatment is preferably 0.1 N (Newton) or more. In addition, from the viewpoint of suppressing of occurrence of excessive deformation during manufacturing, the tension during winding around the winding core for heat treatment is preferably 1.5 N or less, and more preferably 1.0

N or less. An outer diameter of the winding core for heat treatment is preferably 20 mm or more and more preferably 40 mm or more, from the viewpoint of ease of the winding and suppression of coiling (curling in longitudinal direction). In addition, the outer diameter of the winding core for heat treatment is preferably 100 mm or less, and more preferably 90 mm or less. A width of the winding core for heat treatment need only be equal to or more than the width of the magnetic tape wound around this winding core. In addition, in a case where the magnetic tape is removed from the winding core for heat treatment after the heat treatment, it is preferable to remove the magnetic tape from the winding core for heat treatment after the magnetic tape and the winding core for heat treatment are sufficiently cooled, in order to suppress occurrence of unintended deformation of the tape during the removal operation. It is preferable that the removed magnetic tape is once wound around another winding core (referred to as a "temporary winding core"), and then the magnetic tape is wound around the cartridge reel (generally, an outer diameter is about 40 to 50 mm) of the magnetic tape cartridge from the temporary winding core. Therefore, the magnetic tape can be wound around the cartridge reel of the magnetic tape cartridge while maintaining a relationship between an inside and an outside of the magnetic tape with respect to the winding core for heat treatment during the heat treatment. Regarding the details of the temporary winding core and the tension in a case of winding the magnetic tape around the winding core, the description described above regarding the winding core for heat treatment can be referred to. In an aspect in which the heat treatment is applied to the magnetic tape having a length of the "final product length+α", the length corresponding to "+α" need only be cut off in any stage. For example, in one aspect, the magnetic tape for the final product length need only be wound around the reel of the magnetic tape cartridge from the temporary winding core, and the remaining length corresponding to "+α" need only be cut off. From the viewpoint of reducing a portion to be cut off and discarded, the α is preferably 20 m or less.

A specific aspect of the heat treatment performed in a state where the magnetic tape is wound around the core member as described above will be described below.

An atmosphere temperature at which the heat treatment is performed (hereinafter, referred to as a "heat treatment temperature") is preferably 40° C. or higher, and more preferably 50° C. or higher. On the other hand, from the viewpoint of suppressing excessive deformation, the heat treatment temperature is preferably 75° C. or lower, more preferably 70° C. or lower, and still more preferably 65° C. or lower.

A weight-basis absolute humidity of an atmosphere in which the heat treatment is performed is preferably 0.1 g/kg Dry air or more, and more preferably 1 g/kg Dry air or more. An atmosphere having a weight-basis absolute humidity in the above range is preferable because it can be prepared without using a special device for reducing moisture. On the other hand, the weight-basis absolute humidity is preferably 70 g/kg Dry air or less, and more preferably 66 g/kg Dry air or less, from the viewpoint of suppressing occurrence of dew condensation and deterioration of workability. A heat treatment time is preferably 0.3 hours or longer, and more preferably 0.5 hours or longer. In addition, the heat treatment time is preferably 48 hours or less, from the viewpoint of production efficiency.

Regarding the control of the standard deviation of the curvature described above, as any value of the heat treatment temperature, heat treatment time, modulus of bending elasticity of a winding core for heat treatment, and tension during winding around the winding core for heat treatment is large, the value of the standard deviation of the curvature tends to further decrease.

(Formation of Servo Pattern)

The term "formation of servo pattern" can also be referred to as "recording of servo signal". The formation of the servo pattern will be described below.

The servo pattern is usually formed along a longitudinal direction of the magnetic tape. Examples of control (servo control) systems using a servo signal include a timing-based servo (TBS), an amplitude servo, and a frequency servo.

As shown in a European computer manufacturers association (ECMA)-319 (June 2001), a magnetic tape conforming to a linear tape-open (LTO) standard (generally called "LTO tape") employs a timing-based servo system. In this timing-based servo system, the servo pattern is formed by continuously arranging a plurality of pairs of non-parallel magnetic stripes (also referred to as "servo stripes") in the longitudinal direction of the magnetic tape. In the present invention and the present specification, the term "timing-based servo pattern" refers to a servo pattern that enables head tracking in a timing-based servo system. As described above, the reason why the servo pattern is formed of a pair of non-parallel magnetic stripes is to indicate, to a servo signal reading element passing over the servo pattern, a passing position thereof. Specifically, the pair of magnetic stripes is formed such that an interval thereof continuously changes along a width direction of the magnetic tape, and the servo signal reading element reads the interval to thereby sense a relative position between the servo pattern and the servo signal reading element. Information on this relative position enables tracking on a data track. Accordingly, a plurality of servo tracks are usually set on the servo pattern along the width direction of the magnetic tape.

A servo band is formed of a servo pattern continuous in the longitudinal direction of the magnetic tape. A plurality of the servo bands are usually provided on the magnetic tape. For example, in an LTO tape, the number of the servo bands is five. Regions interposed between two adjacent servo bands are data bands. The data band is formed of a plurality of data tracks and each data track corresponds to each servo track.

Further, in one aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in the longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

In a method of uniquely specifying the servo band, a staggered method as shown in ECMA-319 (June 2001) is used. In this staggered method, a group of pairs of non-parallel magnetic stripes (servo stripes) arranged continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319 (June 2001), information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Note that, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for forming a servo pattern is called a servo write head. The servo write head usually has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 μm or less, 1 to 10 μm, 10 μm or more, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two additional methods. A first method is horizontal DC erasing of applying a unidirectional magnetic field along a longitudinal direction of the magnetic tape. A second method is vertical DC erasing of applying a unidirectional magnetic field along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-53940A, in a case where the magnetic pattern is transferred to, using the gap, a magnetic tape that has been subjected to the vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

<Vertical Squareness Ratio>

In one aspect, a vertical squareness ratio of the magnetic tape may be, for example, 0.55 or more, and is preferably 0.60 or more. From the viewpoint of improving the electromagnetic conversion characteristics, it is preferable that the vertical squareness ratio of the magnetic tape is 0.60 or more. In principle, the upper limit of the squareness ratio is 1.00 or less. The vertical squareness ratio of the magnetic tape may be 1.00 or less, 0.95 or less, 0.90 or less, 0.85 or less, or 0.80 or less. From the viewpoint of improving the electromagnetic conversion characteristics, a large value of the vertical squareness ratio of the magnetic tape is preferable. The vertical squareness ratio of the magnetic tape can be controlled by a well-known method such as performing a vertical alignment treatment.

In the present invention and the present specification, the term "vertical squareness ratio" refers to a squareness ratio measured in the vertical direction of the magnetic tape. The term "vertical direction" described regarding the squareness ratio refers to a direction orthogonal to the magnetic layer surface, and can also be referred to as a thickness direction. In the present invention and the present specification, the vertical squareness ratio is obtained by the following method.

A sample piece having a size capable of being introduced into a vibrating sample magnetometer is cut out from the magnetic tape to be measured. For this sample piece, using a vibrating sample magnetometer, a magnetic field is applied in the vertical direction (direction orthogonal to the magnetic layer surface) of the sample piece at a maximum applied magnetic field of 3979 kA/m, a measurement temperature of 296 K, and a magnetic field sweeping speed of 8.3 kA/m/sec, and the magnetization strength of the sample piece with respect to the applied magnetic field is measured. The measured value of the magnetization strength is obtained as a value after demagnetic field correction and as a value obtained by subtracting the magnetization of a sample probe of the vibrating sample magnetometer as a background noise. Assuming that the magnetization strength at the maximum applied magnetic field is Ms and the magnetization intensity at zero applied magnetic field is Mr, a squareness ratio SQ is a value calculated as SQ=Mr/Ms. The measurement temperature refers to a temperature of the sample piece, and, by setting an atmosphere temperature around the sample piece to a measurement temperature, the temperature of the sample piece can be set to a measurement temperature by establishing a temperature equilibrium.

[Magnetic Tape Cartridge]

Another aspect of the present invention relates to a magnetic tape cartridge comprising the magnetic tape described above.

The details of the magnetic tape included in the above magnetic tape cartridge are as described above.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic tape apparatus for recording and/or reproducing data on the magnetic tape, the magnetic tape is pulled out of the magnetic tape cartridge to be wound around the reel on the magnetic tape apparatus side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic tape apparatus side. During this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge.

In one aspect, the magnetic tape cartridge may include a cartridge memory. The cartridge memory can be, for example, a non-volatile memory, and head tilt angle adjustment information is already recorded or the head tilt angle adjustment information is recorded. The head tilt angle adjustment information is information for adjusting the head tilt angle during running of the magnetic tape in the magnetic tape apparatus. For example, as the head tilt angle adjustment information, the value of the servo band interval at each position in the longitudinal direction of the magnetic tape during data recording can be recorded. For example, in a case of reproducing the data recorded on the magnetic tape, the value of the servo band interval can be measured during reproduction, and the head tilt angle can be changed by a control device of the magnetic tape apparatus such that the absolute value of the difference from the servo band interval during recording at the same longitudinal position recorded in the cartridge memory approaches zero. The head tilt angle may be, for example, the angle θ described above.

The magnetic tape and the magnetic tape cartridge can be suitability used in a magnetic tape apparatus (in other words, a magnetic recording and reproducing system) that records and/or reproduces data by changing the head tilt angle during running of the magnetic tape. However, the magnetic tape and the magnetic tape cartridge are not limited to those used in such a magnetic tape apparatus. There is also a use form, for example, in which the head tilt angle in one recording or reproduction and the head tilt angle in subsequent recording or reproduction are changed, and then the head tilt angle is fixed without changing the head tilt angle during each recording or during each reproduction. Even in such a usage form, a magnetic tape having little deterioration in electromagnetic conversion characteristics in a case of recording and/or reproducing data at different head tilt angles is preferable.

[Magnetic Tape Apparatus]

Still another aspect of the present invention relates to a magnetic tape apparatus including the magnetic tape described above. In the magnetic tape apparatus, recording of data on the magnetic tape and/or reproduction of data recorded on the magnetic tape can be performed, for example, as the magnetic layer surface of the magnetic tape and the magnetic head come into contact with each other to be slid on each other. The magnetic tape apparatus can attachably and detachably include the magnetic tape cartridge according to the aspect of the present invention.

The magnetic tape cartridge can be mounted on the magnetic tape apparatus comprising the magnetic head and used for recording and/or reproducing data. In the present invention and the present specification, the term "magnetic tape apparatus" means an apparatus capable of performing at least one of the recording of data on the magnetic tape or the reproduction of data recorded on the magnetic tape. Such an apparatus is generally called a drive.

<Magnetic Head>

The magnetic tape apparatus may include a magnetic head. The configuration of the magnetic head and the angle θ, which is the head tilt angle, are as described above with reference to FIGS. 1 to 3. In a case where the magnetic head includes a reproducing element, a magnetoresistive (MR) element capable of sensitively reading information recorded on the magnetic tape is preferable as the reproducing element. As the MR element, various well-known MR elements (for example, a giant magnetoresistive (GMR) element and a tunnel magnetoresistive (TMR) element) can be used. Hereinafter, a magnetic head that records data and/or reproduces recorded data will also be referred to as a "recording and reproducing head". An element for recording data (recording element) and an element for reproducing data (reproducing element) are collectively referred to as a "magnetic head element".

By reproducing data using a reproducing element having a narrow reproducing element width as a reproducing element, data recorded at high-density can be reproduced with high sensitivity. From this viewpoint, the reproducing element width of the reproducing element is preferably 0.8 μm or less. The reproducing element width of the reproducing element may be, for example, 0.3 μm or more. Note that it is also preferable to be lower than this value from the above viewpoint.

Here, the term "reproducing element width" means a physical dimension of the reproducing element width. Such a physical dimension can be measured by an optical microscope, a scanning electron microscope, or the like.

In a case of recording data and/or reproducing recorded data, first, tracking using the servo signal can be performed. That is, by causing the servo signal reading element to follow a predetermined servo track, the magnetic head element can be controlled to pass on the target data track. Displacement of the data track is performed by changing a servo track read by the servo signal reading element in a tape width direction.

The recording and reproducing head can also perform recording and/or reproduction with respect to other data bands. In this case, the servo signal reading element need only be displaced to a predetermined servo band using the above described UDIM information to start tracking for the servo band.

Figure 5:
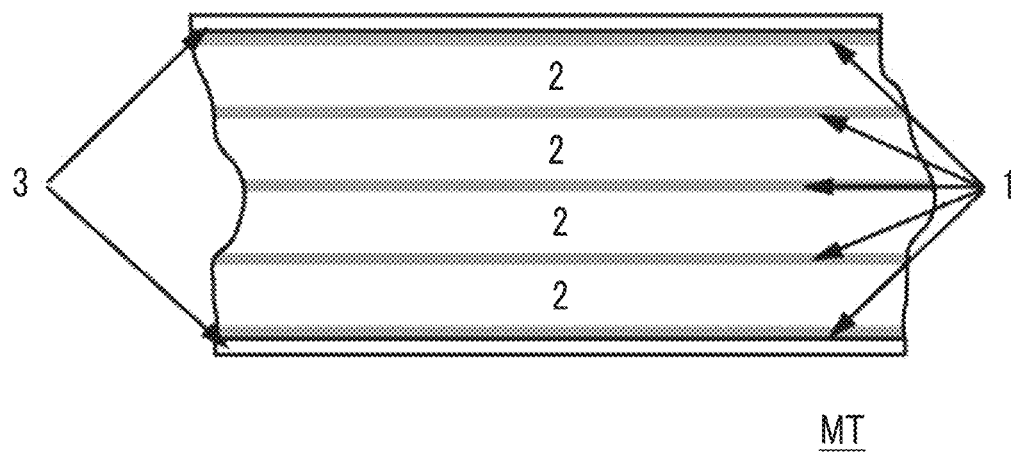
FIG. 5 shows an arrangement example of data bands and servo bands.
Figure 6:
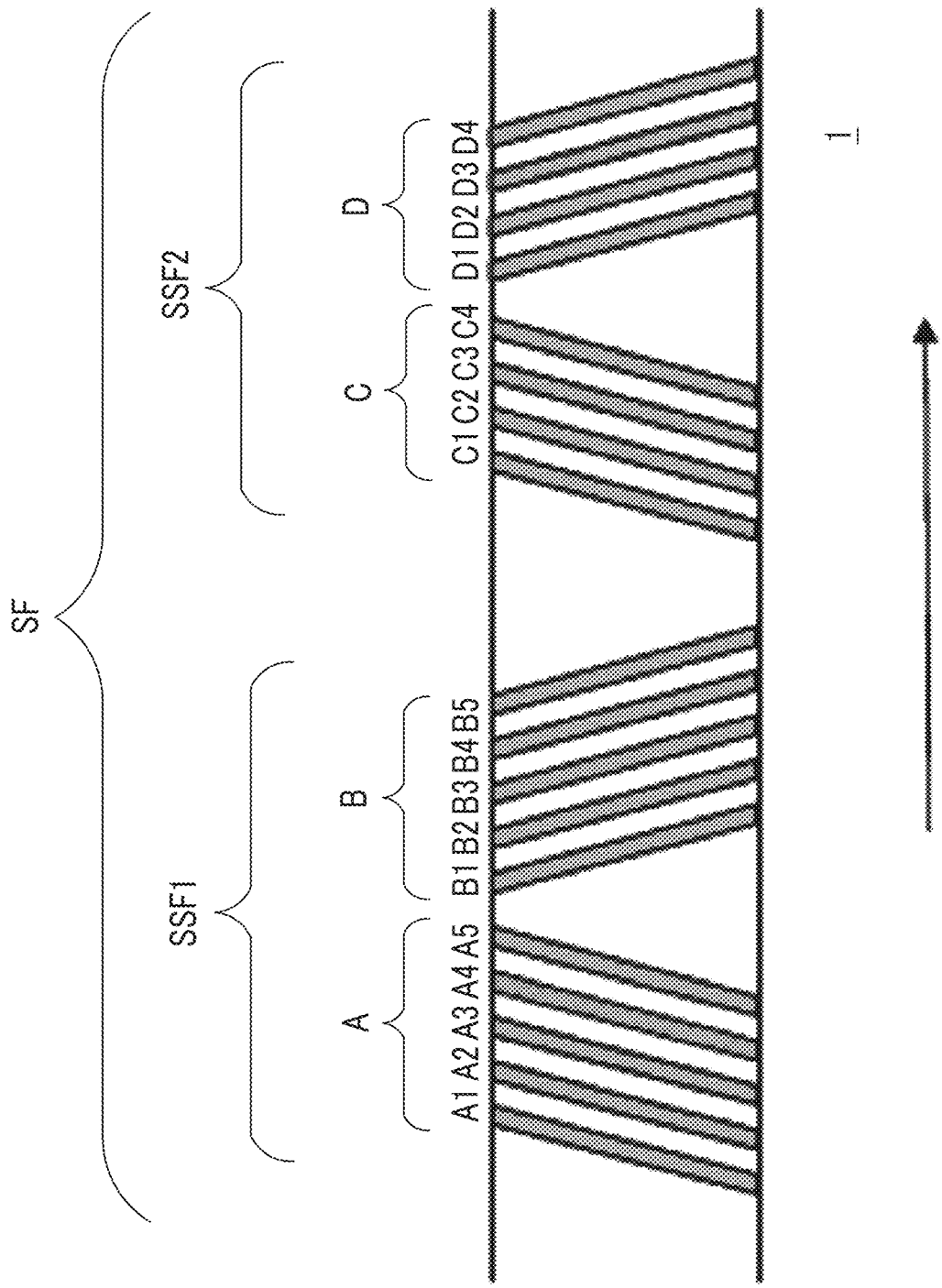
FIG. 6 shows an arrangement example of a servo pattern of a linear tape-open (LTO) Ultrium format tape.

FIG. 5 shows an arrangement example of data bands and servo bands. In FIG. 5, a plurality of servo bands 1 are arranged to be interposed between guide bands 3 in a magnetic layer of a magnetic tape MT. A plurality of regions 2 interposed between two servo bands are data bands. The servo pattern is a magnetization region, and is formed by magnetizing a specific region of the magnetic layer by the servo write head. A region magnetized by the servo write head (a position where the servo pattern is formed) is determined by the standard. For example, in an LTO Ultrium format tape which is based on a local standard, a plurality of servo patterns inclined with respect to a tape width direction as shown in FIG. 6 are formed on a servo band, in a case of manufacturing a magnetic tape. Specifically, in FIG. 6, a servo frame SF on the servo band 1 is composed of a servo sub-frame 1 (SSF1) and a servo sub-frame 2 (SSF2). The servo sub-frame 1 is composed of an A burst (in FIG. 6, reference numeral A) and a B burst (in FIG. 6, reference numeral B). The A burst is composed of servo patterns A1 to A5 and the B burst is composed of servo patterns B1 to B5. Meanwhile, the servo sub-frame 2 is composed of a C burst (in FIG. 6, reference numeral C) and a D burst (in FIG. 6, reference numeral D). The C burst is composed of servo patterns C1 to C4 and the D burst is composed of servo patterns D1 to D4. Such 18 servo patterns are arranged in the sub-frames in an array of 5, 5, 4, 4, as the sets of 5 servo patterns and 4 servo patterns, and are used for identifying the servo frames. FIG. 6 shows one servo frame for description. Note that, in practice, a plurality of the servo frames are arranged in the running direction in each servo band in the magnetic layer of the magnetic tape on which the head tracking of the timing-based servo system is performed. In FIG. 6, the arrow indicates the running direction of the magnetic tape. For example, an LTO Ultrium format tape usually has 5000 or more servo frames per 1 m of tape length in each servo band of the magnetic layer.

In the magnetic tape apparatus, the head tilt angle can be changed during running of the magnetic tape in the magnetic tape apparatus. The head tilt angle is, for example, an angle θ formed by the axis of the element array with respect to the width direction of the magnetic tape. The angle θ is as described above. For example, by providing the recording and reproducing head unit of the magnetic head with an angle adjustment unit for adjusting the angle of the module of the magnetic head, the angle θ can be variably adjusted during running of the magnetic tape. Such an angle adjustment unit can include, for example, a rotation mechanism for rotating the module. A well-known technology can be applied to the angle adjustment unit.

Regarding the head tilt angle during running of the magnetic tape, in a case where the magnetic head includes a plurality of modules, it is possible to specify the angle θ described with reference to FIGS. 1 to 3 for randomly selected modules. $\theta_{initial}$, which is an angle θ at the start of running of the magnetic tape, can be set to 0° or more or more than 0°. This is preferable in terms of adjustment ability to adjust the effective distance between the servo signal reading elements in response to the dimension change in the width direction of the magnetic tape, because the larger $\theta_{initial}$, the larger the amount of change in the effective distance between the servo signal reading elements with respect to the amount of change in the angle θ. From this point, $\theta_{initial}$ is preferably 1° or more, more preferably 5° or more, and still more preferably 10° or more. On the other hand, for an angle (generally referred to as "wrap angle") formed between the magnetic layer surface and the contact surface of the magnetic head surface in a case where the magnetic tape runs and comes into contact with the magnetic head, it is effective to keep the deviation with respect to the tape width direction small in order to improve the uniformity in the tape width direction of the friction generated by the contact between the magnetic head and the magnetic tape during running of the magnetic tape. In addition, it is desirable to increase the uniformity of the friction in the tape width direction from the viewpoint of the position followability and the running stability of the magnetic head. From the viewpoint of reducing the deviation of the wrap angle in the tape width direction, $\theta_{initial}$ is preferably 45° or less, more preferably 40° or less, and still more preferably 35° or less.

Regarding the change in angle θ during running of the magnetic tape, in a case where the angle θ of the magnetic head changes from $\theta_{initial}$ at the start of running while the magnetic tape runs in the magnetic tape apparatus for the recording of data on the magnetic tape and/or for the reproduction of data recorded on the magnetic tape, the maximum change amount Δθ of the angle θ during the running of the magnetic tape is the larger value between $\Delta\theta_{max}$ and $\Delta\theta_{min}$ calculated by the following equation. The maximum value of the angle θ during running of the magnetic tape is $\theta_{max}$, and the minimum value is $\theta_{min}$. Note that "max" is an abbreviation for maximum, and "min" is an abbreviation for minimum.

$$\Delta\theta_{max} = \theta_{max} - \theta_{initial}$$

$$\Delta\theta_{min} = \theta_{initial} - \theta_{min}$$

In one aspect, Δθ may be more than 0.000°, and, from the viewpoint of the adjustment ability to adjust the effective distance between the servo signal reading elements in response to the dimension change in the width direction of the magnetic tape, Δθ is preferably 0.001° or more and more preferably 0.010° or more. From the viewpoint of easiness of ensuring synchronization of the recorded data and/or the reproduced data between a plurality of magnetic head elements during the recording and/or reproduction of the data, Δθ is preferably 1.000° or less, more preferably 0.900° or less, still more preferably 0.800° or less, still more preferably 0.700° or less, and still more preferably 0.600° or less.

In the example shown in FIG. 2 and FIG. 3, the axis of the element array is tilted in the running direction of the magnetic tape. Note that the present invention is not limited to such an example. In the above-described magnetic tape apparatus, an embodiment in which the axis of the element array is tilted in a direction opposite to the running direction of the magnetic tape is also included in the present invention.

$\theta_{initial}$, which is the head tilt angle at the start of running of the magnetic tape, can be set by a control device of the magnetic tape apparatus or the like.

Figure 7:
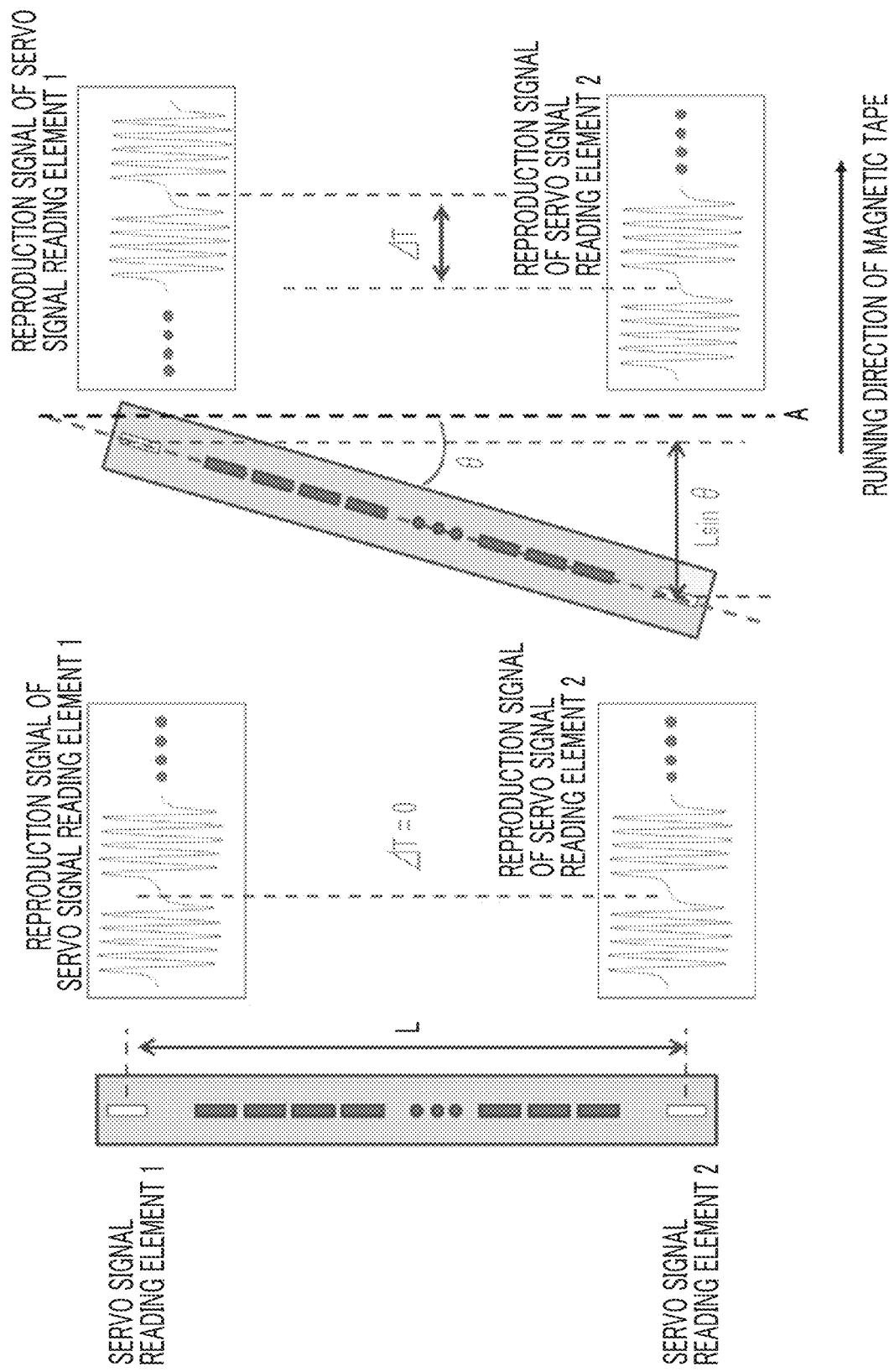
FIG. 7 is an explanatory diagram of a measuring method of an angle θ during magnetic tape running.

Regarding the head tilt angle during running of the magnetic tape, FIG. 7 is an explanatory diagram of a measuring method of the angle θ during running of the magnetic tape. The angle θ during running of the magnetic tape can be obtained, for example, by the following method. In a case where the angle θ during running of the magnetic tape is obtained by the following method, the angle θ is changed in a range of 0° to 90° during running of the magnetic tape. That is, in a case where the axis of the element array is tilted in the running direction of the magnetic tape at the start of running of the magnetic tape, the element array is not tilted such that the axis of the element array is tilted in the direction opposite to the running direction of the magnetic tape at the start of running of the magnetic tape, during running of magnetic tape, and in a case where the axis of the element array is tilted in the direction opposite to the running direction of the magnetic tape at the start of running of the magnetic tape, the element array is not tilted such that the axis of the element array is tilted in the running direction of the magnetic tape at the start of running of the magnetic tape, during running of the magnetic tape.

A phase difference (that is, a time difference) ΔT between the reproduction signals of the pair of servo signal reading elements 1 and 2 is measured. The measurement of ΔT can be performed by a measurement unit provided in the magnetic tape apparatus. A configuration of such a measurement unit is well-known. The distance L between the central portion of the servo signal reading element 1 and the central portion of the servo signal reading element 2 can be measured by an optical microscope or the like. In a case where the running speed of the magnetic tape is a speed v, the distance between the central portions of the two servo signal reading elements in the running direction of the magnetic tape is $L\sin θ$, and a relationship of $L\sin θ=v×ΔT$ is established. Therefore, the angle θ during running of the magnetic tape can be calculated by the equation "θ=arcsin (vΔT/L)". The right figure of FIG. 7 shows an example in which the axis of the element array is tilted in the running direction of the magnetic tape. In this example, the phase difference (that is, the time difference) ΔT of the phase of the reproduction signal of the servo signal reading element 2 with respect to the phase of the reproduction signal of the servo signal reading element 1 is measured. In a case where the axis of the element array is tilted in the direction opposite to the running direction of the magnetic tape, θ can be obtained by the above-described method except for a point where ΔT is measured as the phase difference (that is, the time difference) of the phase of the reproduction signal of the servo signal reading element 1 with respect to the phase of the reproduction signal of the servo signal reading element 2.

A pitch suitable for a measurement pitch of the angle θ, that is, a measurement interval of the angle θ in the tape longitudinal direction can be selected according to a frequency of the tape width deformation in the tape longitudinal direction. As an example, the measurement pitch can be set to, for example, 250 μm.

<Configuration of Magnetic Tape Apparatus>

Figure 8:
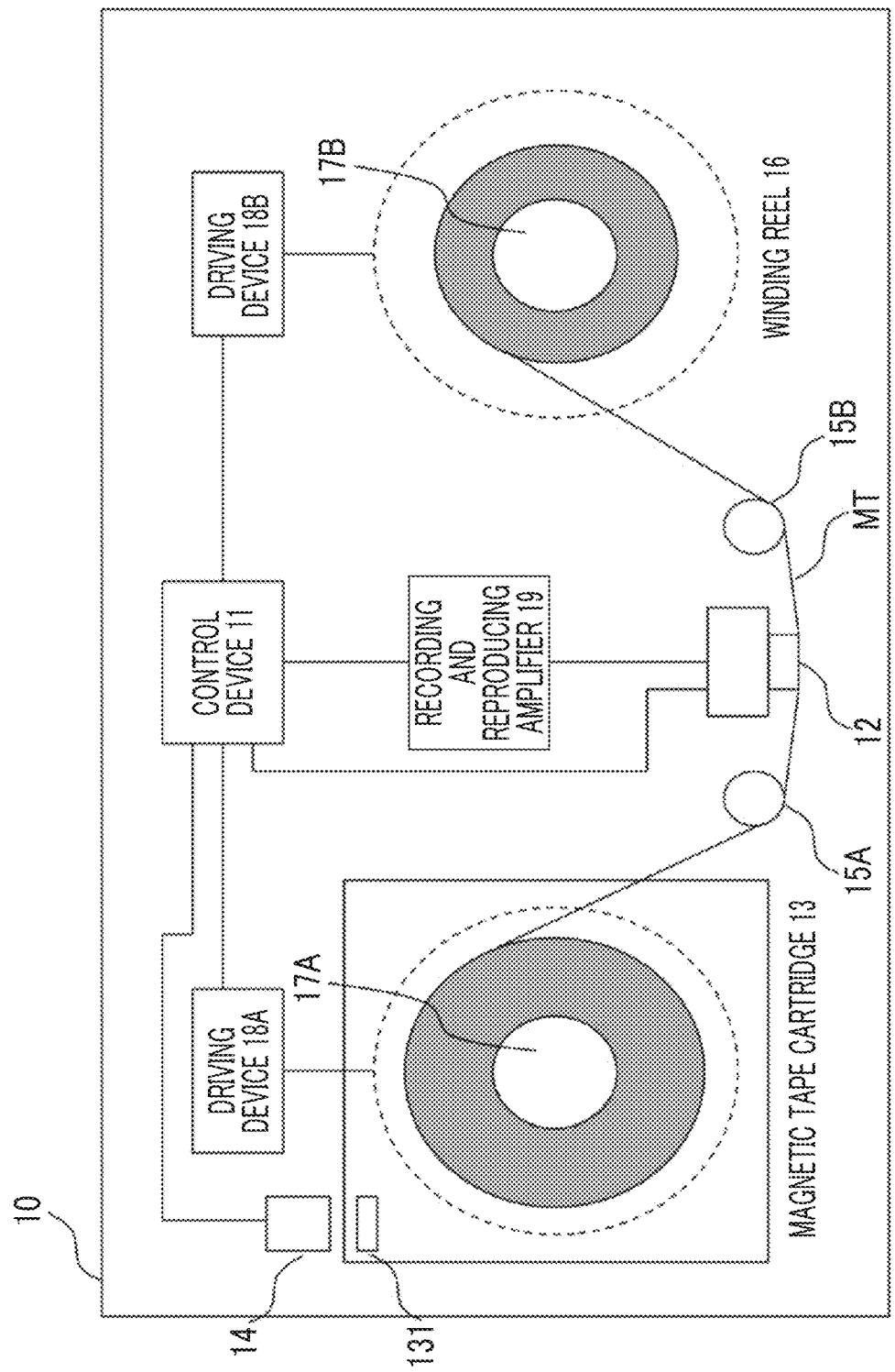
FIG. 8 is a schematic view showing an example of the magnetic tape apparatus.

A magnetic tape apparatus 10 shown in FIG. 8 controls a recording and reproducing head unit 12 in accordance with an instruction from a control device 11, and records and reproduces data on a magnetic tape MT.

The magnetic tape apparatus 10 has a configuration capable of detecting and adjusting the tension applied in the longitudinal direction of the magnetic tape from spindle motors 17A and 17B for controlling rotation of a magnetic tape cartridge reel and a winding reel and driving devices 18A and 18B thereof.

The magnetic tape apparatus 10 has a configuration capable of loading a magnetic tape cartridge 13.

The magnetic tape apparatus 10 has a cartridge memory reading and writing device 14 capable of reading and writing a cartridge memory 131 in the magnetic tape cartridge 13.

From the magnetic tape cartridge 13 mounted on the magnetic tape apparatus 10, an end part or a leader pin of the magnetic tape MT is pulled out by an automatic loading mechanism or a manual operation, and the magnetic layer surface of the magnetic tape MT passes on the recording and reproducing head through guide rollers 15A and 15B in a direction contacting with a recording and reproducing head surface of the recording and reproducing head unit 12, and thus the magnetic tape MT is wound around a winding reel 16.

The rotation and torque of the spindle motor 17A and the spindle motor 17B are controlled by a signal from the control device 11, and the magnetic tape MT is run at any speed and tension. A servo pattern formed in advance on the magnetic tape can be used for a control of the tape speed and a control of the head tilt angle. In order to detect the tension, a tension detecting mechanism may be provided between the magnetic tape cartridge 13 and the winding reel 16. The tension may be controlled by using the guide rollers 15A and 15B in addition to the control by the spindle motors 17A and 17B.

The cartridge memory reading and writing device 14 is configured to be capable of reading out and writing information in the cartridge memory 131 in response to an instruction from the control device 11. As a communication method between the cartridge memory reading and writing device 14 and the cartridge memory 131, for example, an international organization for standardization (ISO) 14443 method can be employed.

The control device 11 includes, for example, a controller, a storage unit, a communication unit, and the like.

The recording and reproducing head unit 12 includes, for example, a recording and reproducing head, a servo tracking actuator that adjusts a position of the recording and reproducing head in the track width direction, a recording and reproducing amplifier 19, a connector cable for connection with the control device 11, and the like. The recording and reproducing head includes, for example, a recording element for recording data on the magnetic tape, a reproducing element for reproducing data on the magnetic tape, and a servo signal reading element for reading a servo signal recorded on the magnetic tape. For example, one or more recording elements, reproducing elements, and servo signal reading elements are mounted in one magnetic head. Alternatively, each element may be separately provided in a plurality of magnetic heads according to the running direction of the magnetic tape.

The recording and reproducing head unit 12 is configured to be capable of recording data on the magnetic tape MT in response to an instruction from the control device 11. In addition, the recording and reproducing head unit 12 is configured to be capable of reproducing the data recorded on the magnetic tape MT is configured to be able to be reproduced in response to an instruction from the control device 11.

The control device 11 has a mechanism for obtaining the running position of the magnetic tape from the servo signal read from the servo band in a case where the magnetic tape MT is run, and controlling the servo tracking actuator such that the recording element and/or the reproducing element is located at a target running position (track position). The track position is controlled by feedback control, for example.

The control device 11 has a mechanism for obtaining a servo band interval from servo signals read from two adjacent servo bands in a case where the magnetic tape MT is run. The control device 11 can store the obtained information on the servo band interval in the storage unit inside the control device 11, the cartridge memory 131, an external connection device, or the like. In addition, the control device 11 can change the head tilt angle according to the dimension information in the width direction of the magnetic tape during running. Accordingly, the effective distance between the servo signal reading elements can be made to approximate to or match with the interval between the servo bands. The dimension information can be acquired by using a servo pattern formed in advance on the magnetic tape. For example, in this way, during running of the magnetic tape in the magnetic tape apparatus, the angle θ formed by the axis of the element array with respect to the width direction of the magnetic tape can be changed according to the dimension information in the width direction of the magnetic tape acquired during running. The head tilt angle can be adjusted, for example, by feedback control. For example, the adjustment of the head tilt angle can also be performed by the method disclosed in JP2016-524774A or US2019/0164573A1.

EXAMPLES

Hereinafter, the present invention will be described based on Examples. Note that the present invention is not limited to the embodiments shown in Examples. Unless otherwise noted, "parts" and "%" in the following description indicate "parts by mass" and "mass %". The processes and evaluations in the following description were performed in an environment of a temperature of 23° C.±1° C., unless otherwise noted. In addition, "eq" described below indicates an equivalent that is a unit that cannot be converted into an SI unit system.

[Ferromagnetic Powder]

In Table 2, "BaFe" is a hexagonal barium ferrite powder having an average particle size (average plate diameter) of 21 nm.

In Table 2, "SrFe1" is a hexagonal strontium ferrite powder manufactured by the following method.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a pair of water-cooling rollers to manufacture an amorphous body.

280 g of the manufactured amorphous body was charged into an electric furnace, was heated to 635° C. (crystallization temperature) at a temperature rising rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 ml of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving treatment of a glass component, and then the crystallized product was sedimented by a centrifugal separator to be washed by repeatedly performing decantation and was dried in a heating furnace at an in-furnace temperature of 110° C. for 6 hours to obtain a hexagonal strontium ferrite powder.

An average particle size of the hexagonal strontium ferrite powder obtained above was 18 nm, an activation volume was 902 $nm^3$, an anisotropy constant Ku was $2.2\times10^5$ $J/m^3$, and a mass magnetization σs was 49 $A\cdot m^2/kg$.

12 mg of a sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was determined.

Separately, 12 mg of a sample powder was taken from the hexagonal strontium ferrite powder obtained above, elemental analysis of the filtrated solution obtained by totally dissolving this sample powder under dissolution conditions illustrated above was performed by an ICP analyzer, and a bulk content of a neodymium atom was determined.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro diffractometer, PIXcel detector
Soller slit of incident beam and diffracted beam: 0.017 radians
Fixed angle of dispersion slit: ¼ degrees
Mask: 10 mm
Anti-scattering slit: ¼ degrees
Measurement mode: continuous
Measurement time per stage: 3 seconds
Measurement speed: 0.017 degrees per second
Measurement step: 0.05 degrees In Table 2, "SrFe2" is a hexagonal strontium ferrite powder manufactured by the following method.

1725 g of $SrCO_3$, 666 g of $H_3BO_3$, 1332 g of $Fe_2O_3$, 52 g of $Al(OH)_3$, 34 g of $CaCO_3$, and 141 g of $BaCO_3$ were weighed and mixed by a mixer to obtain a raw material mixture.

The obtained raw material mixture was melted in a platinum crucible at a melting temperature of 1380° C., and a hot water outlet provided at a bottom of the platinum crucible was heated while stirring a melt, and the melt was discharged in a rod shape at about 6 g/sec. Hot water was rolled and quenched by a pair of water-cooling rollers to manufacture an amorphous body.

280 g of the obtained amorphous body was charged into an electric furnace, was heated to 645° C. (crystallization temperature), and was held at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 ml of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving treatment of a glass component, and then the crystallized product was sedimented by a centrifugal separator to be washed by repeatedly performing decantation and was dried in a heating furnace at an in-furnace temperature of 110° C. for 6 hours to obtain a hexagonal strontium ferrite powder.

An average particle size of the obtained hexagonal strontium ferrite powder was 19 nm, an activation volume was 1102 $nm^3$, an anisotropy constant Ku was $2.0\times10^5$ $J/m^3$, and a mass magnetization σs was 50 $A\cdot m^2/kg$.

In Table 2, "ε-iron oxide" is an s-iron oxide powder manufactured by the following method.

8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid solution obtained by dissolving 1 g of citric acid in 9 g of pure water was added to the obtained solution, and the mixture was stirred for 1 hour. The powder sedimented after stirring was collected by centrifugal separation, was washed with pure water, and was dried in a heating furnace at an in-furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was added dropwise and was stirred for 24 hours. A powder sedimented by adding 50 g of ammonium sulfate to the obtained reaction solution was collected by centrifugal separation, was washed with pure water, and was dried in a heating furnace at an in-furnace temperature of 80° C. for 24 hours to obtain a ferromagnetic powder precursor.

The obtained ferromagnetic powder precursor was loaded into a heating furnace at an in-furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was checked by high-frequency inductively coupled plasma-optical emission spectrometry (ICP-OES) has Ga, Co, and a Ti substitution type ε-iron oxide (ε-$Ga_{0.28}Co_{0.05}Ti_{0.05}Fe_{1.62}O_3$). In addition, X-ray diffraction analysis was performed under the same condition as that described above for SrFe1, and from a peak of an X-ray diffraction pattern, it was confirmed that the obtained ferromagnetic powder does not include α-phase and γ-phase crystal structures, and has a single-phase and ε-phase crystal structure (ε-iron oxide crystal structure).

The obtained ε-iron oxide powder had an average particle size of 12 nm, an activation volume of 746 $nm^3$, an anisotropy constant Ku of $1.2 \times 10^5$ $J/m^3$, and a mass magnetization σs of 16 $A \cdot m^2/kg$.

An activation volume and an anisotropy constant Ku of the above hexagonal strontium ferrite powder and ε-iron oxide powder are values obtained by the method described above using a vibrating sample magnetometer (manufactured by Toei Industry Co., Ltd.) for each ferromagnetic powder.

In addition, a mass magnetization σs is a value measured at a magnetic field intensity of 15 kOe using a vibrating sample magnetometer (manufactured by Toei Industry Co., Ltd.).

[Preparation of Abrasive Solution]
<Preparation of Abrasive Solution A>

2,3-dihydroxynaphthalene (manufactured by Tokyo Chemical Industry Co., Ltd.) having the amount shown in Table 1, 31.3 parts of a 32% solution (solvent is a mixed solvent of methyl ethyl ketone and toluene) of a polyester polyurethane resin having a $SO_3Na$ group as a polar group (UR-4800 manufactured by Toyobo Co., Ltd. (amount of a polar group: 80 meq/kg)), and 570.0 parts of a mixed liquid of methyl ethyl ketone and cyclohexanone at 1:1 (mass ratio) as a solvent were mixed with respect to 100.0 parts of the abrasive (alumina powder) shown in Table 1, and dispersed in the presence of zirconia beads (bead diameter: 0.1 mm) by a paint shaker for the time (beads dispersion time) shown in Table 1.

After the dispersion, the dispersion liquid obtained by separating the dispersion liquid and the beads with a mesh was subjected to centrifugal separation. The centrifugal separation was carried out using CS150GXL manufactured by Koki Holdings Co., Ltd. (the rotor used is S100ΔT6 manufactured by Koki Holdings Co., Ltd.) as a centrifugal separator at the rotation speed (rotation per minute (rpm)) shown in Table 1 for the time (centrifugal separation time) shown in Table 1. By this centrifugal separation, particles having a relatively large particle size were sedimented, and particles having a relatively small particle size were dispersed in a supernatant.

After that, a supernatant solution was collected by decantation. This collected liquid is called an "abrasive solution A".

<Preparation of Abrasive Solutions B and C>

An abrasive solution B and an abrasive solution C were prepared in the same manner as in the preparation of the abrasive solution A except that various items were changed as shown in Table 1.

TABLE 1

| | | Abrasive solution A | Abrasive solution B | Abrasive solution C |
|---|---|---|---|---|
| Preparation of abrasive solution | Abrasive solution trade name (manufactured by Sumitomo Chemical Co., Ltd.) | Hit80 | Hit70 | Hit70 |
| | BET specific surface area ($m^2/g$) | 30 | 20 | 20 |
| | Content of abrasive solution dispersing agent (2,3-dihydroxynaphthalene) | 3.0 parts | 3.0 parts | 3.0 parts |
| | Beads dispersion time | 360 minutes | 180 minutes | 60 minutes |
| | Centrifugal separation  Rotation speed | 5500 rpm | 3500 rpm | 1000 rpm |
| | Centrifugal separation time | 4 minutes | 4 minutes | 4 minutes |

Example 1

\<Preparation of Composition for Forming Magnetic Layer\>
(Magnetic Liquid)
  Ferromagnetic powder (see Table 2): 100.0 parts
  Oleic acid: 2.0 parts
  Vinyl chloride copolymer (MR-104 manufactured by Zeon Corporation): 10.0 parts
  $SO_3Na$ group-containing polyurethane resin: 4.0 parts (Weight-Average Molecular Weight: 70000, $SO_3Na$ Group: 0.07 Meq/g)
  Polyalkyleneimine polymer (synthetic product obtained by the method disclosed in paragraphs 0115 to 0123 of JP2016-51493A): 6.0 parts
  Methyl ethyl ketone: 150.0 parts
  Cyclohexanone: 150.0 parts
(Abrasive Solution)
  Use the abrasive solution shown in Table 2 such that the amount of abrasive in the abrasive solution is the amount shown in Table 2
(Other Components)
  Carbon black (average particle size: 20 nm): 0.7 parts
  Polyethyleneimine (manufactured by Nippon Shokubai Co., Ltd., number-average molecular weight of 300): 2.0 parts
  Stearic acid: 0.5 parts
  Stearic acid amide: 0.3 parts
  Butyl stearate: 6.0 parts
  Methyl ethyl ketone: 110.0 parts
  Cyclohexanone: 110.0 parts
  Polyisocyanate (CORONATE (registered trademark) L manufactured by Tosoh Corporation): 3.0 parts
(Preparation Method)

Various components of the above magnetic liquid were dispersed using zirconia beads (first dispersion beads, density of 6.0 g/cm³) having a bead diameter of 0.5 mm by a batch type vertical sand mill for 24 hours (first stage), and then filtered using a filter having a pore diameter of 0.5 μm. Thereby, a dispersion liquid A was prepared. The zirconia beads were used in an amount of 10 times the mass of the ferromagnetic powder on a mass basis.

After that, the dispersion liquid A was dispersed using diamond beads (second dispersion beads, density of 3.5 g/cm³) having a bead diameter of 500 nm by a batch type vertical sand mill for 1 hour (second stage), and a dispersion liquid (dispersion liquid B) in which the diamond beads were separated using a centrifugal separator was prepared. The diamond beads were used in an amount of 10 times the mass of the ferromagnetic powder on a mass basis.

The dispersion liquid B, the abrasive solution, and the other components described above were put into a dissolver stirrer, and stirred for 360 minutes at a circumferential speed of 10 m/sec. After that, an ultrasonic dispersion treatment was performed at a flow rate of 7.5 kg/min for 60 minutes by a flow type ultrasonic dispersing device, and then the obtained liquid was filtered three times through a filter having a pore diameter of 0.3 μm. Thereby, a composition for forming a magnetic layer was prepared.

\<Preparation of Composition for Forming Non-Magnetic Layer\>

Various components of the following composition for forming a non-magnetic layer were dispersed using zirconia beads having a bead diameter of 0.1 mm by a batch type vertical sand mill for 24 hours, and then filtered using a filter having a pore diameter of 0.5 μm. Thereby, composition for forming a non-magnetic layer was prepared.

Non-magnetic inorganic powder α-iron oxide: 100.0 parts (Average Particle Size: 10 nm, BET Specific Surface Area: 75 m²/g)
  Carbon black: 25.0 parts
  (Average particle size: 20 nm)
  $SO_3Na$ group-containing polyurethane resin: 18.0 parts (Weight-Average Molecular Weight: 70000, $SO_3Na$ Group Content: 0.2 Meq/g)
  Stearic acid: 1.0 part
  Cyclohexanone: 300.0 parts
  Methyl ethyl ketone: 300.0 parts \<Preparation of Composition for Forming Back Coating Layer\>

Components other than a lubricant (stearic acid and butyl stearate), polyisocyanate, and 200.0 parts of cyclohexanone among various components of the following composition for forming a back coating layer were kneaded and diluted by an open kneader, and then subjected to a dispersion treatment of 12 passes using a horizontal beads mill dispersing device and zirconia beads having a bead diameter of 1 mm, by setting a bead filling rate to 80 volume %, a circumferential speed of a rotor distal end to 10 m/sec, and a retention time per 1 pass to 2 minutes. After that, the remaining components were added thereto and stirred by a dissolver, and the obtained dispersion liquid was filtered using a filter having a pore diameter of 1 μm. Thereby, a composition for forming a back coating layer was prepared.

Non-magnetic inorganic powder α-iron oxide: 80.0 parts (Average Particle Size: 0.15 μm, BET Specific Surface Area: 52 m²/g)
  Carbon black: 20.0 parts
  (Average Particle Size: 20 nm)
  Vinyl chloride copolymer: 13.0 parts
  Sulfonic acid base-containing polyurethane resin: 6.0 parts
  Phenylphosphonic acid: 3.0 parts
  Cyclohexanone: 155.0 parts
  Methyl ethyl ketone: 155.0 parts
  Stearic acid: 3.0 parts
  Butyl stearate: 3.0 parts
  Polyisocyanate: 5.0 parts
  Cyclohexanone: 200.0 parts \<Manufacture of Magnetic Tape and Magnetic Tape Cartridge\>

The composition for forming a non-magnetic layer prepared in the above section was applied onto a surface of a polyethylene naphthalate support having a thickness of 4.1 μm and was dried so that the thickness after drying is a thickness of 0.7 μm, and thus a non-magnetic layer was formed.

Next, the composition for forming a magnetic layer prepared in the above section was applied onto the non-magnetic layer so that the thickness after drying is 0.1 μm, and thus a coating layer was formed.

After that, while this coating layer of the composition for forming a magnetic layer is in a wet state, a vertical alignment treatment was performed by applying a magnetic field of a magnetic field intensity of 0.3 T in a direction perpendicular to a surface of the coating layer, and then the surface of the coating layer was dried. Thereby, a magnetic layer was formed.

After that, the composition for forming a back coating layer prepared above was applied onto a surface of the support opposite to the surface on which the non-magnetic layer and the magnetic layer are formed and was dried so that the thickness after drying was 0.3 μm, and thus, a back coating layer was formed.

After that, a surface smoothing treatment (calendering treatment) was performed using a calender roll formed of only metal rolls at a speed of 100 m/min, a linear pressure of 300 kg/cm, and a calender temperature of 90° C. (surface temperature of calender roll). In this way, a long magnetic tape original roll was obtained.

After that, a heat treatment was performed for 36 hours in an environment of an atmosphere temperature of 70° C., and then a long magnetic tape original roll was slit to have ½ inches width to obtain a magnetic tape.

A servo signal was recorded on the magnetic layer of the obtained magnetic tape by a commercially available servo writer, to obtain a magnetic tape having a data band, a servo band, and a guide band in an arrangement according to a linear tape-open (LTO) Ultrium format and having a servo pattern (timing-based servo pattern) in an arrangement and a shape according to the LTO Ultrium format on the servo band. The servo pattern thus formed is a servo pattern according to the description in Japanese industrial standards (JIS) X6175:2006 and Standard ECMA-319 (June 2001). The total number of servo bands is 5, and the total number of data bands is 4.

A magnetic tape (length of 960 m) on which the servo signal was recorded as described above was wound around the reel of the magnetic tape cartridge (LTO Ultrium 8 data cartridge), and a leader tape according to Article 9 of Section 3 of standard European Computer Manufacturers Association (ECMA)-319 (June 2001) was joined to an end thereof by using a commercially available splicing tape.

In this way, the magnetic tape cartridge in which the magnetic tape was wound on a reel was manufactured.

It could be confirmed by the following method that the magnetic layer of the magnetic tape includes a compound formed of polyethyleneimine and stearic acid and including the ammonium salt structure of the alkyl ester anion represented by Formula 1.

A sample was cut out from the magnetic tape, and X-ray photoelectron spectroscopy analysis was performed on the magnetic layer surface (measurement region: 300 μm×700 μm) using an ESCA device. Specifically, the wide scanning measurement was performed by the ESCA device under the following measurement conditions. In measurement results, peaks were confirmed at a binding energy position of an ester anion and a binding energy position of an ammonium cation.

Device: AXIS-ULTRA manufactured by Shimadzu Corporation
Excited X-ray source: monochromatic Al-Kα ray
Scanning range: 0 to 1200 eV
Pass energy: 160 eV
Energy resolution: 1 eV/step
Take-in time: 100 ms/step
Accumulation number: 5

In addition, a sample piece having a length of 3 cm was cut out from the magnetic tape, and the attenuated total reflection-fourier transform-infrared spectrometer (ATR-FT-IR) measurement (reflection method) was performed on the magnetic layer surface. In measurement results, an absorption was confirmed at the wave number (1540 $cm^{-1}$ or 1430 $cm^{-1}$) corresponding to an absorption of $COO^-$ and the wave number (2400 $cm^{-1}$) corresponding to an absorption of an ammonium cation.

Examples 2 to 18 and Comparative Examples 1 to 10

A magnetic tape and a magnetic tape cartridge were obtained by the method described in Example 1, except that the items shown in Table 2 were changed as shown in Table 2.

In Examples 15 to 18, the step after recording the servo signal was changed as follows. That is, the heat treatment was performed after recording the servo signal. On the other hand, in Examples 2 to 14 and Comparative Examples 1 to 10, since such a heat treatment was not performed, "None" was shown in the column of "Heat treatment condition" in Table 2.

In Examples 15 to 18, the magnetic tape (length of 970 m) after recording the servo signal was wound around the winding core for heat treatment as described in Example 1, and the heat treatment was performed in a state where the magnetic tape was wound around this core. As the core for heat treatment, a solid core member (outer diameter: 50 mm) formed of a resin and having a value of a modulus of bending elasticity shown in Table 2 was used, and the tension in a case of the winding was set as a value shown in Table 2. The heat treatment temperature and heat treatment time in the heat treatment were set to values shown in Table 2. The weight-basis absolute humidity in the atmosphere in which the heat treatment was performed was 10 g/kg Dry air.

After the heat treatment, the magnetic tape and the winding core for heat treatment were sufficiently cooled, the magnetic tape was removed from the winding core for heat treatment and wound around the temporary winding core, and then, the magnetic tape having the final product length (960 m) was wound around the reel of the magnetic tape cartridge (LTO Ultrium 8 data cartridge) from the temporary winding core. The remaining length of 10 m was cut out and the leader tape based on section 9 of Standard European Computer Manufacturers Association (ECMA)-319 (June 2001) Section 3 was bonded to the terminal of the cut side by using a commercially available splicing tape. As the temporary winding core, a solid core member made of the same material and having the same outer diameter as the winding core for heat treatment was used, and the tension during winding was set as 0.6 N.

In this way, the magnetic tape cartridge in which the magnetic tape was wound on a reel was manufactured.

In each of Examples and Comparative Examples, four magnetic tape cartridges were prepared, one for the following evaluation of the deterioration in electromagnetic conversion characteristics and the other three for the following evaluations (1) to (3) of the magnetic tape.

[Evaluation of Deterioration in Electromagnetic Conversion Characteristics (Signal-to-Noise-Ratio (SNR) Decrease Amount)]

The SNR decrease amount was obtained as an evaluation of the deterioration in electromagnetic conversion characteristics by the following method. The following recording and reproducing were performed using a reel tester having ½ inches with a fixed magnetic head, and executed four times in total by sequentially changing the head tilt angle in the order of 0°, 15°, 30°, and 45°. The head tilt angle is an angle θ formed by the axis of the element array of the reproducing module described below with respect to the width direction of the magnetic tape at the start of running of each time. The angle θ was set by the control device of the magnetic tape apparatus at the start of running of the magnetic tape of each time, and the head tilt angle was fixed during running of the magnetic tape of each time.

For each magnetic tape (total length of magnetic tape: 960 m) of Examples and Comparative Examples, in an environment of a temperature of 23° C. and a relative humidity of 50%, 1000 passes of recording and reproduction were performed by applying a tension of 1.5 N (hereinafter, referred to as a "running tension") in the longitudinal direction of the magnetic tape, and then 1000 passes of recording and reproduction were performed by applying a tension of 0.2 N in the longitudinal direction of the magnetic tape. A relative speed between the magnetic tape and the magnetic head was set to 8 m/sec, and in the used magnetic head, the arrangement order of the modules is "recording module-reproducing module-recording module" (total number of modules: 3). The number of magnetic head elements in each module is 32 (Ch0 to Ch31), and the element array is configured by sandwiching these magnetic head elements between the pair of servo signal reading elements. A recording element of the recording module is a metal-in-gap (MIG) element (gap length of 0.15 μm, track width of 1.0 μm), and recording was performed by setting a recording current to the optimum recording current of each magnetic tape. A reproducing element of the reproducing module is a giant-magnetoresistive (GMR) element (an element thickness of 15 nm, a shield interval of 0.1 μm, and a reproducing element width of 0.8 μm). A signal having a linear recording density of 300 kfci was recorded, and measurement regarding a reproduction signal was performed with a spectrum analyzer manufactured by Shibasoku Co., Ltd. The unit kfci is a unit of a linear recording density (cannot be converted into an SI unit system). As the signal, a portion where the signal was sufficiently stable after start of the running of the magnetic tape was used.

At each time, a difference between the SNR of the first pass at the running tension of 1.5 N and the SNR of the 1000th pass at the running tension of 0.2 N (SNR of the 1000th pass at the running tension of 0.2 N—SNR of the first pass at the running tension of 1.5 N) was calculated and used as the SNR decrease amount. An arithmetic average of the SNR decrease amount obtained for the four different head tilt angles is shown in the column of "SNR decrease amount" in Table 2.

[Evaluation of Magnetic Tape]

(1) AlFeSil Abrasion Value$_{45°}$ and Standard Deviation of AlFeSil Abrasion Value The magnetic tape was taken out from each magnetic tape cartridge of Examples and Comparative Examples, and in an environment of a temperature of 23° C. and a relative humidity of 50%, the AlFeSil abrasion value$_{45°}$ and the standard deviation of the AlFeSil abrasion value were obtained by the method described above.

(2) Standard Deviation of Curvature of Magnetic Tape in Longitudinal Direction

The magnetic tape was taken out from the magnetic tape cartridge in each of Examples and Comparative Examples, and the standard deviation of the curvature of the magnetic tape in the longitudinal direction was obtained by the method described above.

(3) Tape Thickness

Ten tape samples (length of 5 cm) were cut out from any part of the magnetic tape taken out from each magnetic tape cartridge of Examples and Comparative Examples, and the thickness was measured by stacking these tape samples. The thickness was measured using a digital thickness gauge of Millimar 1240 compact amplifier and Millimar 1301 induction probe manufactured by MARH Inc. A value (thickness per tape sample) obtained by dividing the measured thickness by 1/10 was defined as the tape thickness. Each magnetic tape had a thickness of 5.2 μm.

The above results are shown in Table 2 (Tables 2-1 and 2-2).

TABLE 2-1

| | Composition for forming magnetic layer | | | | | |
|---|---|---|---|---|---|---|
| | Ferromagnetic powder Type | Polyethyleneimine Presence or absence of addition | Stearic acid Presence or absence of addition | Abrasive amount (parts) | | |
| | | | | A | B | C |
| Example 1 | BaFe | Added | Added | 1 | 1 | 0 |
| Example 2 | BaFe | Added | Added | 4 | 3 | 1 |
| Example 3 | BaFe | Added | Added | 3 | 3 | 1 |
| Example 4 | BaFe | Added | Added | 6 | 4 | 1 |
| Example 5 | BaFe | Added | Added | 6 | 2 | 1 |
| Example 6 | BaFe | Added | Added | 6 | 3 | 2 |
| Example 7 | BaFe | Added | Added | 3 | 5 | 3.5 |
| Example 8 | BaFe | Added | Added | 9.5 | 1 | 0.5 |
| Example 9 | BaFe | Added | Added | 3 | 1.5 | 1.5 |
| Example 10 | BaFe | Added | Added | 4 | 2 | 2.5 |
| Example 11 | BaFe | Added | Added | 4 | 3.5 | 2.5 |
| Example 12 | SrFe1 | Added | Added | 6 | 3 | 1 |
| Example 13 | SrFe2 | Added | Added | 6 | 3 | 1 |
| Example 14 | ε-Iron oxide | Added | Added | 6 | 3 | 1 |
| Example 15 | BaFe | Added | Added | 3 | 3 | 1 |
| Example 16 | BaFe | Added | Added | 3 | 3 | 1 |
| Example 17 | BaFe | Added | Added | 3 | 3 | 1 |
| Example 18 | BaFe | Added | Added | 3 | 3 | 1 |

TABLE 2-1-continued

| | Heat treatment condition | | | | AlFeSil abrasion value$_{45°}$ (μm) | Standard deviation of AlFeSil abrasion value (μm) | Standard deviation of curvature (mm/m) | SNR decrease amount (dB) |
|---|---|---|---|---|---|---|---|---|
| | Temperature | Time | Bending elastic modulus of core | Tension during winding around core | | | | |
| Example 1 | None | None | None | None | 20 | 30 | 6 | 0.6 |
| Example 2 | None | None | None | None | 20 | 30 | 6 | 0.6 |
| Example 3 | None | None | None | None | 25 | 30 | 6 | 0.8 |
| Example 4 | None | None | None | None | 30 | 25 | 6 | 0.9 |
| Example 5 | None | None | None | None | 37 | 18 | 6 | 0.8 |
| Example 6 | None | None | None | None | 32 | 20 | 6 | 0.6 |
| Example 7 | None | None | None | None | 40 | 18 | 6 | 0.8 |
| Example 8 | None | None | None | None | 50 | 30 | 6 | 0.9 |
| Example 9 | None | None | None | None | 30 | 20 | 6 | 0.7 |
| Example 10 | None | None | None | None | 35 | 22 | 6 | 0.8 |
| Example 11 | None | None | None | None | 50 | 25 | 6 | 0.4 |
| Example 12 | None | None | None | None | 50 | 25 | 6 | 0.5 |
| Example 13 | None | None | None | None | 28 | 18 | 6 | 0.6 |
| Example 14 | None | None | None | None | 28 | 18 | 6 | 0.6 |
| Example 15 | 50° C. | 5 hours | 0.8 GPa | 0.6N | 30 | 25 | 5 | 0.6 |
| Example 16 | 60° C. | 5 hours | 0.8 GPa | 0.6N | 30 | 25 | 4 | 0.4 |
| Example 17 | 70° C. | 5 hours | 0.8 GPa | 0.6N | 30 | 25 | 3 | 0.4 |
| Example 18 | 70° C. | 15 hours | 0.8 GPa | 0.8N | 30 | 25 | 2 | 0.3 |

TABLE 2-2

| | Composition for forming magnetic layer | | | | | |
|---|---|---|---|---|---|---|
| | Ferromagnetic powder Type | Polyethyleneimine Presence or absence of addition | Stearic acid Presence or absence of addition | Abrasive amount (parts) | | |
| | | | | A | B | C |
| Example 1 | BaFe | Absent | Added | 0 | 0 | 3 |
| Example 2 | BaFe | Absent | Added | 0 | 0 | 5 |
| Example 3 | BaFe | Absent | Added | 0 | 0 | 10 |
| Example 4 | BaFe | Absent | Added | 0 | 0 | 15 |
| Example 5 | BaFe | Absent | Added | 7 | 4 | 3 |
| Example 6 | BaFe | Absent | Added | 6 | 3 | 1 |
| Example 7 | BaFe | Added | Added | 7 | 4 | 3 |
| Example 8 | BaFe | Added | Added | 1 | 0.5 | 0 |
| Example 9 | BaFe | Added | Added | 0.5 | 0.5 | 0 |
| Example 10 | BaFe | Added | Added | 0 | 0.5 | 0 |

TABLE 2-2-continued

| | Heat treatment condition | | | | AlFeSil abrasion value$_{45°}$ (μm) | Standard deviation of AlFeSil abrasion value (μm) | Standard deviation of curvature (mm/m) | SNR decrease amount (dB) |
|---|---|---|---|---|---|---|---|---|
| | Temperature | Time | Bending elastic modulus of core | Tension during winding around core | | | | |
| Example 1 | None | None | None | None | 52 | 32 | 6 | 1.5 |
| Example 2 | None | None | None | None | 60 | 35 | 6 | 1.8 |
| Example 3 | None | None | None | None | 73 | 35 | 6 | 1.9 |
| Example 4 | None | None | None | None | 79 | 36 | 6 | 2 |
| Example 5 | None | None | None | None | 70 | 32 | 6 | 1.6 |
| Example 6 | None | None | None | None | 53 | 32 | 6 | 1.6 |
| Example 7 | None | None | None | None | 52 | 35 | 6 | 1.5 |
| Example 8 | None | None | None | None | 19 | 10 | 6 | 2.2 |
| Example 9 | None | None | None | None | 10 | 5 | 6 | 2.5 |
| Example 10 | None | None | None | None | 5 | 5 | 6 | 3 |

It can be confirmed from the results shown in Table 2 that, in the magnetic tape in Examples in which the AlFeSil abrasion value$_{45°}$ and the standard deviation of the AlFeSil abrasion value are both within the ranges described above, the deterioration in electromagnetic conversion characteristics in a case of running the magnetic tape at different head tilt angles was suppressed compared to the magnetic tape in Comparative Examples.

A magnetic tape cartridge was manufactured in the same manner as in Example 1 except that the vertical alignment treatment was not performed in the manufacture of the magnetic tape.

A sample piece was cut out from the magnetic tape taken out from the magnetic tape cartridge. For this sample piece, a vertical squareness ratio obtained by the method described above using a TM-TRVSM5050-SMSL type manufactured by Tamakawa Co., Ltd. as a vibrating sample magnetometer was 0.55.

The magnetic tape was also taken out from the magnetic tape cartridge of Example 1, and a vertical squareness ratio was similarly determined for a sample piece cut out from the magnetic tape, which was 0.60.

Each of the magnetic tapes taken out from the above two magnetic tape cartridges was attached to a reel tester having ½ inches, and the electromagnetic conversion characteristics (Signal-to-Noise Ratio (SNR)) were evaluated by the following method. As a result, the magnetic tape taken out from the magnetic tape cartridge of Example 1 had a higher SNR value by 2 dB than the magnetic tape manufactured without the vertical alignment treatment.

In an environment of a temperature of 23° C. and a relative humidity of 50%, a tension of 0.7 N was applied in the longitudinal direction of the magnetic tape, and recording and reproduction were performed for 10 passes. A relative speed between the magnetic tape and the magnetic head was set to 6 m/sec, and recording was performed by using a metal-in-gap (MIG) head (a gap length of 0.15 μm and a track width of 1.0 μm) as a recording head and setting a recording current to an optimal recording current of each magnetic tape. Reproduction was performed by using a giant-magnetoresistive (GMR) head (an element thickness of 15 nm, a shield interval of 0.1 μm, and a reproducing element width of 0.8 μm) as a reproducing head. The head tilt angle was set to 0°. A signal having a linear recording density of 300 kfci was recorded, and measurement regarding a reproduction signal was performed with a spectrum analyzer manufactured by Shibasoku Co., Ltd. The unit kfci is a unit of a linear recording density (cannot be converted into an SI unit system). As the signal, a portion where the signal was sufficiently stable after start of the running of the magnetic tape was used.

One aspect of the present invention is useful in various data storage technical fields.

What is claimed is:

1. A magnetic tape comprising:
   a non-magnetic support; and
   a magnetic layer containing a ferromagnetic powder,
   wherein, in an environment of a temperature of 23° C. and a relative humidity of 50%,
      an AlFeSil abrasion value$_{45°}$ of a magnetic layer surface measured at a tilt angle of 45° of an AlFeSil square bar is 20 μm or more and 50 μm or less,
      standard deviation of an AlFeSil abrasion value of the magnetic layer surface measured at each of tilt angles of 0°, 15°, 30°, and 45° of the AlFeSil square bar is 30 μm or less, and
   the tilt angle of the AlFeSil square bar is an angle formed by a longitudinal direction of the AlFeSil square bar and a width direction of the magnetic tape.

2. The magnetic tape according to claim 1,
   wherein the standard deviation of the AlFeSil abrasion value is 15 μm or more and 30 μm or less.

3. The magnetic tape according to claim 1,
   wherein standard deviation of a curvature in a longitudinal direction of the magnetic tape is 5 mm/m or less.

4. The magnetic tape according to claim 1,
   wherein the magnetic layer contains one or more non-magnetic powders.

5. The magnetic tape according to claim 4,
wherein the non-magnetic powder includes an alumina powder.

6. The magnetic tape according to claim 1, further comprising:
a non-magnetic layer containing a non-magnetic powder between the non-magnetic support and the magnetic layer.

7. The magnetic tape according to claim 1, further comprising:
a back coating layer containing a non-magnetic powder on a surface side of the non-magnetic support opposite to a surface side having the magnetic layer.

8. The magnetic tape according to claim 1,
wherein a vertical squareness ratio of the magnetic tape is 0.60 or more.

9. The magnetic tape according to claim 1,
wherein the standard deviation of the AlFeSil abrasion value is 15 μm or more and 30 μm or less,
standard deviation of a curvature in a longitudinal direction of the magnetic tape is 5 mm/m or less,
the magnetic layer contains an alumina powder,
a non-magnetic layer containing a non-magnetic powder is provided between the non-magnetic support and the magnetic layer,
a back coating layer containing a non-magnetic powder is provided on a surface side of the non-magnetic support opposite to a surface side having the magnetic layer, and
a vertical squareness ratio of the magnetic tape is 0.60 or more.

10. A magnetic tape cartridge comprising:
the magnetic tape according to claim 1.

11. A magnetic tape apparatus comprising:
the magnetic tape according to claim 1.

12. The magnetic tape apparatus according to claim 11, further comprising:
a magnetic head,
wherein the magnetic head has a module including an element array with a plurality of magnetic head elements between a pair of servo signal reading elements, and
the magnetic tape apparatus changes an angle θ formed by an axis of the element array with respect to a width direction of the magnetic tape during running of the magnetic tape in the magnetic tape apparatus.

* * * * *